(12) United States Patent
Murakami et al.

(10) Patent No.: US 7,676,544 B2
(45) Date of Patent: Mar. 9, 2010

(54) FILE SHARING SYSTEM, FILE SHARING METHOD, AND RECORDING MEDIUM STORING FILE SHARING PROGRAM

(75) Inventors: Masahiko Murakami, Kawasaki (JP); Sumiyo Okada, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 11/393,654

(22) Filed: Mar. 31, 2006

(65) Prior Publication Data

US 2007/0136432 A1    Jun. 14, 2007

(30) Foreign Application Priority Data

Dec. 9, 2005  (JP)  ............................. 2005-356617

(51) Int. Cl.
   *G06F 15/16*   (2006.01)
(52) U.S. Cl. .................. 709/204; 709/205; 715/751; 715/753
(58) Field of Classification Search ................ 715/751, 715/753; 709/204, 205
See application file for complete search history.

(56) References Cited

U.S. PATENT DOCUMENTS

| | | | |
|---|---|---|---|
| 6,826,272 B1 * | 11/2004 | Dalrymple et al. | 379/220.01 |
| 7,623,523 B2 * | 11/2009 | Kondou et al. | 370/395.21 |
| 2007/0079249 A1 * | 4/2007 | Pall et al. | 715/758 |
| 2009/0138808 A1 * | 5/2009 | Moromisato et al. | 715/758 |

FOREIGN PATENT DOCUMENTS

| | | |
|---|---|---|
| JP | 2004-266325 A | 9/2004 |
| JP | 2004-297250 A | 10/2004 |

\* cited by examiner

*Primary Examiner*—Creighton Smith
(74) *Attorney, Agent, or Firm*—Westerman, Hattori, Daniels & Adrian, LLP

(57) ABSTRACT

A file sharing system connected to both a telephone network and a data communication network includes a telephone conversation state monitoring part for recording information for identifying speakers having a telephone conversation for each telephone conversation in a recording part as telephone conversation state data, a sharing space generating part for generating a file sharing space to a file sharing server for each telephone conversation, and recording information for identifying a file sharing space and information for identifying a speaker in a recording part in such a manner that they are associated with each other, and an access control part enabling access from a communication terminal by the speaker associated in the association data, among accesses from the communication terminals with respect to the file sharing Space. Because of this, the file sharing system allows a file to be shared with a party on the other side during a telephone conversation even without using a terminal with a particular function added thereto.

13 Claims, 18 Drawing Sheets

| Telephone conversation state | Speaker I | Speaker II |
|---|---|---|
| During a telephone conversation | 0001 | 0002 |
| Disconnection | 0003 | 0004 |
| ... | ... | ... |

FIG. 2A

| Sharing space ID | Speaker I | Speaker II |
|---|---|---|
| share0001 | 0001 | 0002 |
| share0002 | 0003 | 0004 |
| share0003 | 0001 | 0003 |
| ... | ... | ... |

FIG. 2B

| Telephone number | Mail address |
|---|---|
| 0001 | sato@example.com |
| 0002 | takagi@example.com |
| ... | ... |

FIG. 2C

| Telephone conversation state | Disconnection time | Speaker I | Speaker II |
|---|---|---|---|
| During a telephone conversation | | 0001 | 0002 |
| Disconnection | 2005/9/22 15:52 | 0003 | 0004 |
| ... | | ... | ... |

FIG. 8

| Telephone number | User ID |
|---|---|
| 0001 | sato |
| 0002 | takagi |
| ... | ... |

FIG. 9

| Sharing space ID | Access permission /inhibition information |
|---|---|
| share0001 | allow from all |
| share0002 | deny from all |
| ... | |

FIG. 16

FILE SHARING SYSTEM, FILE SHARING METHOD, AND RECORDING MEDIUM STORING FILE SHARING PROGRAM

BACKGROUND OF THE INVENTION

1. Field of the Invention

The present invention relates to a file sharing system, a file sharing method, and a file sharing program for realizing telephone service that enables a plurality of speakers to share a file during a telephone conversation.

2. Description of Related Art

A telephone is communication means that has been used conventionally, and is still used at present time widely irrespective of age or sex. On the other hand, recently, as a result of the spread of a personal computer (PC), the Internet, a digital camera, and the like, it is possible to take a picture and immediately show it to a person at a distance owing to the development of a data communication network such as the Internet. Under such circumstances, for example, there is an increasing demand for taking a picture, showing it to a party on the other end, and sharing it with the party on the other end, thereby talking about the picture, during a telephone conversation. There has been also a demand for having a conversation while watching the same document and material as those of a party on the other end in business as well as the above-mentioned personal use.

Conventionally, such a demand has been satisfied using, for example, a softphone that realizes a telephone function with software on a PC. More specifically, files and uniform resource locators (URLs) can be transferred to a party on the other end one by one, using a file transfer function or a file sharing function of the softphone.

Furthermore, a communication terminal realizing the above-mentioned demand is disclosed by, for example, JP 2004-266325 A. This document proposes a communication terminal in which a function for sharing a file on the Web is added to an internet protocol (IP) telephone terminal. In this communication terminal, a URL showing the location of a file on the Web is transmitted to a communication terminal of a party on the other end using an electronic mail protocol to share the file on the Web with the communication terminal of the party on the other end.

Furthermore, as disclosed by, for example, JP 2004-297250 A, a portable terminal having a function of transmitting information for identifying shared data to a terminal of a partner on the other end is also proposed.

SUMMARY OF THE INVENTION

However, according to any of the above-mentioned conventional methods, it is necessary to implement the function for sharing a file at terminals on both sides between which a telephone conversation is performed. More specifically, in the softphone, it is necessary to implement software of the softphone in which the same protocol is used at terminals on both sides. Furthermore, the methods described in JP 2004-266325 A and JP 2004-297250 A are predicated on the use of a terminal with a function for sharing a file added thereto.

The present invention solves the above-mentioned problem, and its object is to provide a file sharing system, a file sharing program, and a file sharing method, enabling a file to be shared with a party on the other side during a telephone conversation without using a terminal with a special function added thereto.

A file sharing system of the present invention connected to a telephone conversation control apparatus that controls a telephone conversation between a plurality of telephone conversation terminals, includes: a telephone conversation state monitoring part for detecting a telephone conversation between the telephone conversation terminals and obtaining information for specifying speakers on both sides having a telephone conversation for each telephone conversation, from the telephone conversation control apparatus, and recording the information in a recording part as telephone conversation state data; a sharing space generating part for generating a file sharing space to be shared by the speakers on both sides specified by the telephone conversation state data on a recording medium accessible from a plurality of data communication terminals, associating information for identifying the generated file sharing space with the information for specifying the speakers on both sides, and recording them in the recording part as association data; and an access control part for enabling access of the speakers on both sides corresponding to the file sharing space represented by the association data from the data communication terminals, among accesses from the data communication terminals with respect to the file sharing space.

The sharing space generating part generates a file sharing space corresponding to speakers on both sides specified by the telephone conversation state data. Therefore, a file sharing space to be shared by speakers on both sides in a telephone conversation detected by the telephone conversation state monitoring part can be generated dynamically. The generated file sharing space is associated with information for identifying the speakers sharing the file sharing space by the association data. Therefore, the access control part uses the association data to control access to the file sharing space so that the speakers on both sides corresponding to the file sharing space can access from the data communication terminals.

The speakers on both sides access the file sharing space using the data communication terminals during a telephone conversation, thereby adding, updating, or obtaining data to the file sharing space. Because of this, even if a special function for sharing a file is not provided at the telephone conversation terminal used by the speakers on both sides for a telephone conversation or the data communication terminals used for data communication, the speaker on one side can share a file with the speaker on the other side during a telephone conversation.

A file sharing program recorded on a recording medium in the present invention causes a computer connected to a telephone conversation control apparatus controlling a telephone conversation between a plurality of telephone conversation terminals to execute processing, the program including: telephone conversation state monitoring processing of detecting a telephone conversation between the telephone conversation terminals and obtaining information for specifying speakers on both sides having a telephone conversation for each telephone conversation, from the telephone conversation control apparatus, and recording the information in a recording part provided in the computer as telephone conversation state data; sharing space generating processing of generating a file sharing space to be shared by the speakers on both sides specified by the telephone conversation state data on a recording medium accessible from a plurality of data communication terminals, associating information for identifying the generated file sharing space with the information for specifying the speakers on both sides, and recording them in the recording part as association data; and access control processing of permitting access from the data communication terminals by the speakers on both sides represented by the information for specifying the speakers corresponding to the file sharing space in the association data, among accesses from the data communication terminals with respect to the file sharing space.

A file sharing method of the present invention for enabling speakers to share a file by using a computer connected to a telephone conversation control apparatus controlling a telephone conversation between a plurality of telephone conversation terminals, includes: a telephone conversation state monitoring operation in which a telephone conversation state monitoring part provided in the computer detects a telephone conversation between the telephone conversation terminals and obtains information for specifying speakers on both sides having a telephone conversation for each telephone conversation, from the telephone conversation control apparatus, and records the information in a recording part provided in the computer as telephone conversation state data; a sharing space generating operation in which a sharing space generating part provided in the computer generates a file sharing space to be shared by the speakers on both sides specified by the telephone conversation state data on a recording medium accessible from a plurality of data communication terminals, associates information for identifying the generated file sharing space with the information for specifying the speakers on both sides, and records them in the recording part as association data; and an access control operation in which the access control part provided in the computer permits access from the data communication terminals by the speakers on both sides represented by the information for specifying the speakers corresponding to the file sharing space in the association data, among accesses from the data communication terminals with respect to the file sharing space.

According to the present invention, a file sharing system, a file sharing program, and a file sharing method can be provided, which allow a file to be shared with a party on the other side during a telephone conversation even without using a terminal with a special function added thereto.

BRIEF DESCRIPTION OF THE DRAWINGS

FIG. 2A shows an example of telephone conversation state data; FIG. 2B shows an example of association data; and FIG. 2C shows an example of speaker data.

FIG. 8 shows an example of telephone conversation state data in the case where a disconnection time is recorded.

FIG. 9 shows a configuration of speaker data.

FIG. 16 shows an exemplary table constituting access control data.

DETAILED DESCRIPTION OF THE INVENTION

Figure 1:
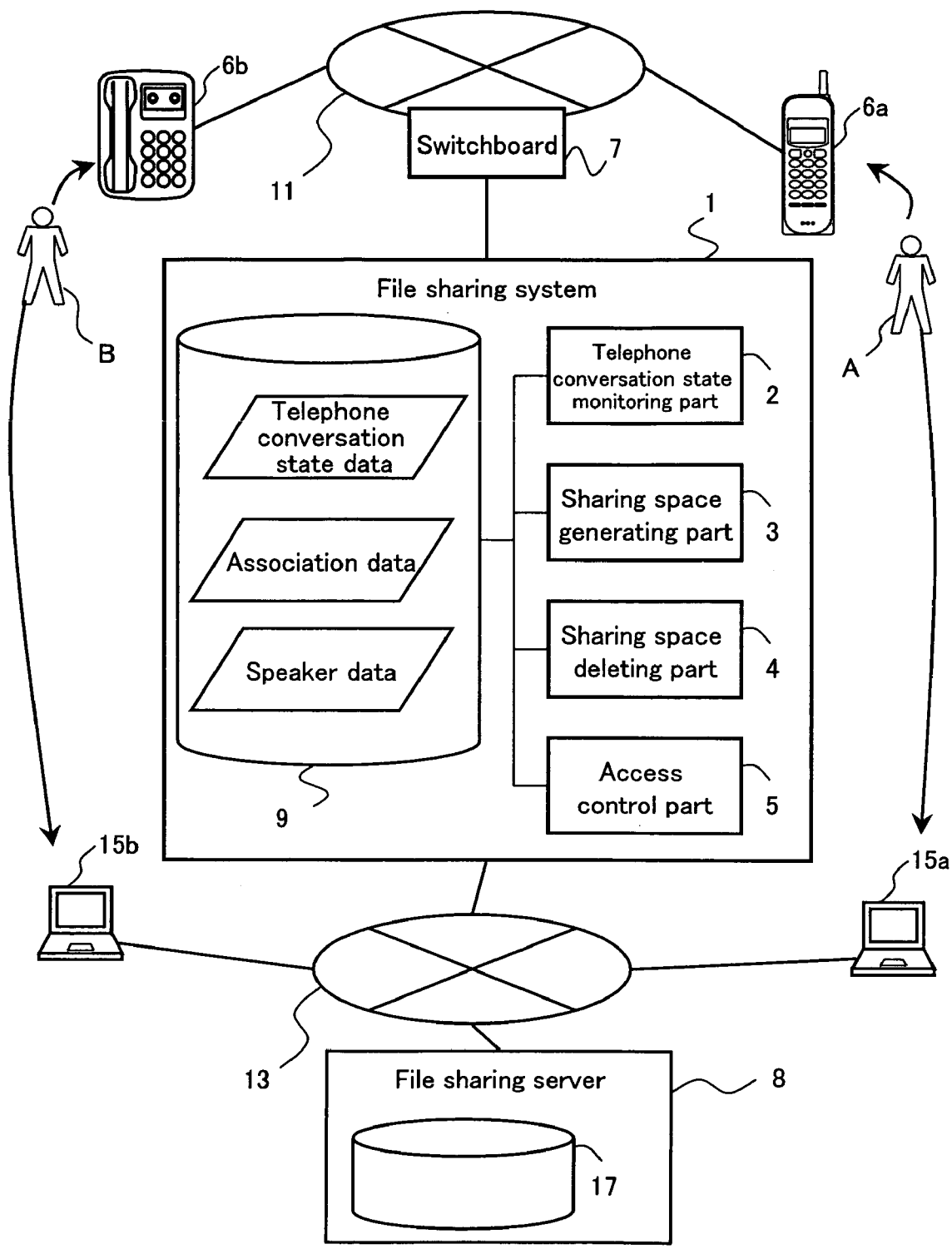
FIG. 1 is a functional block diagram showing an exemplary configuration of a file sharing system.

A file sharing space is a logical memory area accessible by a data communication terminal.

A telephone network is a communication network for enabling a telephone conversion between connected telephones. The telephone network may be a telephone network for connecting general telephones, including a public switched telephone network, or may be a telephone network for connecting telephones on a premise (in a company, in the school, etc.). An IP network connecting IP telephones is also included in the telephone network.

A telephone conversation is mutual communication through a voice between a plurality of particular terminals via the telephone network.

A data communication network is a communication network for performing data communication between a plurality of computers, such as the Internet and an intranet (local area network (LAN)).

In the file sharing system according to the present invention, it is preferable that the telephone conversation state monitoring part detects commencement of the telephone conversation between the telephone conversation terminals, obtains the information for identifying the speakers having a telephone conversation for each telephone conversation, and records the information in the recording part as telephone conversation state data, and the sharing space generating part generates the file sharing space at a time when the commencement of the telephone conversation is detected.

The sharing space generating part dynamically generates the file sharing space when the telephone conversation state monitoring part detects the commencement of a telephone conversation. Therefore, the speakers on both sides can share data in the file sharing space at a time of the commencement of a telephone conversation.

In the file sharing system according to the present invention, it is preferable that the telephone conversation state monitoring part further detects a signal that is transmitted from the telephone conversation terminals during a telephone conversation and designates generation of the file sharing space, and the sharing space generating part generates the file sharing space after the telephone conversation state monitoring part detects the signal.

The sharing space generating part can dynamically generate the file sharing space after the telephone conversation state monitoring part detects the signal transmitted from a telephone conversation terminal. Therefore, the speaker transmits the signal using a telephone conversation terminal, thereby causing the sharing space generating part to generate a file sharing space. Furthermore, the speaker controls a timing at which the signal is sent, using the telephone conversation terminal, thereby controlling the timing at which the sharing space generating part generates the file sharing space.

In the file sharing system according to the present invention, it is preferable that the recording medium on which the file sharing space is generated is a recording part of a previously determined file sharing server, and in a case where there is access from a data communication terminal to the file sharing server, the sharing space generating part obtains user information for specifying a user from the data communication terminal, compares the user information with the information for specifying the speakers having a telephone conversation recorded in the telephone conversation state data, and generates the file sharing space in a case of determining that the user is identical with one of the speakers having a telephone conversation.

According to the above configuration, the speaker having a telephone conversation accesses the file sharing server from the data communication terminal, thereby causing the sharing apace generating part to generate a file sharing space. Furthermore, the speaker can freely determine a timing at which the file sharing space is generated.

In the file sharing system according to the present invention, it is preferable that the telephone conversation state monitoring part further detects completion of the telephone conversation, and the file sharing system further includes a sharing space deleting part for obtaining information for identifying the file sharing space corresponding to the speakers in the telephone conversation whose completion is detected by the telephone conversation state monitoring part, and deleting the file sharing space represented by the information immediately after the detection or after the elapse of a predetermined time from the detection.

The sharing space deleting part deletes a file sharing space of the speakers in a completed telephone conversation. Therefore, the file sharing space can be kept in the file sharing server only when the file sharing space is required (e.g., during a telephone conversation or within a predetermined time after the completion of the telephone conversation). Therefore, a resource of the file sharing server can be used efficiently.

In the file sharing system according to the present invention, it is preferable that the telephone conversation state monitoring part further detects completion of the telephone conversation, and the access control part obtains the information for identifying the file sharing space of the speakers in the telephone conversation whose completion is detected by the telephone conversation state monitoring part from the association data, and inhibits access from data communication terminals to the file sharing space represented by the information immediately after the completion of the telephone conversation or after the elapse of a predetermined time from the completion of the telephone conversation.

The access control part disables access from the data communication terminals to the file sharing space regarding a completed telephone conversation. Therefore, the file sharing space can be shared only when the file sharing space is required (e.g., during a telephone conversation or during a predetermined period of time after the completion of a telephone conversation). Therefore, the speakers on both sides can access the file sharing space using the data communication terminals only while they are having a telephone conversation or after the elapse of a predetermined time from the completion of the telephone conversation.

In the file sharing system according to the present invention, it is preferable that regarding the file sharing space whose access from the data communication terminals is inhibited, in a case where the telephone conversation by the speakers on both sides associated with the file sharing space by the association data is detected by the telephone conversation state monitoring part, the access control part permits access from the data communication terminals to the file sharing space by the speakers on both sides.

According to the above-mentioned configuration, in the case where the speaker has a telephone conversation with the same party on the other side again after the completion of a telephone conversation, the speaker can share data in the file sharing space shared previously again. Furthermore, in the case where a telephone conversation with the speakers on both sides being the same is performed a plurality of times, a previous file sharing space is shared in the second and subsequent telephone conversations. Therefore, it is not necessary for the sharing space generating part to newly generate a file sharing space. Consequently, the processing amount of the sharing space generating part is reduced, and a resource of the file sharing server can be used efficiently.

In the file sharing system according to the present invention, it is preferable that the recording medium on which the file sharing space is generated is a recording part of a previously determined file sharing server, and the file sharing system further includes a browsing part for, in a case where there is access from a data communication terminal to the file sharing server, obtaining user information for specifying a user from the data communication terminal, obtaining data for specifying a speaker on the other side in a past telephone conversation of the user or data in a file sharing space generated in a past telephone conversation from the association data, and transmitting the data regarding the speaker on the other side or the data in the file sharing space to the data communication terminal.

The association data contains information for identifying a file sharing space and information for identifying speakers corresponding to each file sharing space. Therefore, the browsing part can obtain data on a speaker on the other side in a past telephone conversation of a user or a file sharing space shared in the past, with reference to the association data. The browsing part transmits these data to the data communication terminal, so that the user of the data communication terminal can obtain data representing the party on the other side in the past telephone conversation and data shared in the file sharing space in the past.

In file sharing system according to the present invention, it is preferable that the telephone conversation state monitoring part detects the telephone conversation between the telephone conversation terminals and obtains the information for specifying the speakers on both sides having a telephone conversation for each telephone conversation, from the telephone conversation control apparatus provided in a telephone network to which a plurality of telephone conversation terminals are connected, and recording the information in the recording part as telephone conversation state data, and the sharing space generating part generates the file sharing space on the recording medium on a computer connected to a data communication network to which a plurality of data communication terminals are connected.

According to the above-mentioned configuration, the speakers on both sides in a telephone conversation by telephone conversation terminals via a telephone network can share data in a file sharing space, using data communication terminals connected to a data communication network.

In the file sharing system according to the present invention, it is preferable that the access control part transmits information for accessing the file sharing space to the data communication terminals of the speakers on both sides represented by the information for specifying the speakers on both sides corresponding to the file sharing space in the association data, thereby enabling access from the data communication terminals of the speakers on both sides.

The access control part transmits the information for accessing the file sharing space to the data communication terminals of the speakers, so that the speakers can access the file sharing space from the data communication terminals using the information.

In the file sharing system according to the present invention, it is preferable that in a case where there is access from the data communication terminal to the file sharing space, the access control part obtains user information for specifying a user from the data communication terminal, compares the user information with the information specifying the speakers on both sides corresponding to the file sharing space in the association data, and in a case of determining that either one of the speakers is matched with the user, enables access from the data communication terminal.

The access control part can determine whether or not a user of a data communication terminal having accessed a file sharing space is a speaker to share the file sharing space, by comparing the information for specifying the speakers on both sides corresponding to the file sharing space with the user information. This enables access from the data communication terminals by the speakers on both sides corresponding to the file sharing space represented by the association data.

Hereinafter, the present invention will be described in detail by way of one embodiment with reference to the drawings.

Embodiment 1

FIG. 1 is a functional block diagram showing an exemplary configuration of a file sharing system 1 in the present embodiment. The file sharing system 1 is connected to a switchboard 7 as a telephone conversation control server in a telephone network 11, and the Internet 13. A plurality of telephone conversation terminals including telephone conversation terminals 6a, 6b are connected to the telephone network 11. For example, the telephone conversation terminal 6a is connected to the telephone conversation terminal 6b of a party on the other side by the switchboard 7, whereby a telephone conversation becomes possible between the telephone conversation terminals 6a, 6b. The telephone network 11 is, for example, a public exchange telephone network.

The switchboard 7 controls a telephone conversation of the telephone network 11, and transmits information represent-ing a telephone conversation state to the file sharing system 1. For example, when a telephone conversation is established between telephone conversation terminals, the switchboard 7 transmits telephone conversation establishment information representing that the telephone conversion is established, and telephone numbers of telephone conversation terminals of the established telephone conversation to the file sharing system 1. Furthermore, when the telephone conversation is disconnected, the switchboard 7 transmits telephone conversation disconnection information representing that the telephone conversation is disconnected to the file sharing system 1. The switchboard 7 functions as a telephone conversation control server (telephone conversation control apparatus) controlling a telephone conversation in the telephone network 11.

A file sharing server 8, and data communication terminals 15a, 15b are connected to the Internet 13. The file sharing server 8 has a function of a Web server accessible by the data communication terminals 15a, 15b. The data communication terminals 15a, 15b can access data in a recording part 17 of the file sharing server 8 via the Internet 13.

The file sharing system 1 includes a telephone conversation state monitoring part 2, a sharing space generating part 3, a sharing space deleting part 4, an access control part 5, and a recording part 9. In the recording part 9, telephone conversation state data, speaker data, and association data are recorded.

The telephone conversation state monitoring part 2 receives telephone conversation state data representing a telephone conversation state from the switchboard 7. The telephone conversation state data is recorded in the recording part 9. The telephone conversation state data contains, for example, information regarding the establishment or disconnection of a telephone conversation, and information for specifying a speaker. For example, telephone conversation establishment information representing the establishment of a telephone conversation, a telephone number for identifying a telephone conversation terminal in the established telephone conversation, telephone conversation disconnection information representing the disconnection of a telephone conversation, and the like are contained in the telephone conversation state data.

FIG. 2A shows an example of telephone conversation state data. In the example shown in FIG. 2A, a telephone conversation state and telephone numbers of speakers I, II on both sides are recorded for each telephone conversation in the telephone conversation state data. When the telephone conversation state monitoring part 2 receives the telephone conversation establishment information from the switchboard 7, the telephone conversation state monitoring part 2 generates an entry containing telephone numbers of speakers on both sides in the telephone conversation, and sets the telephone conversation state in that entry to be "during a telephone conversation". Furthermore, when the telephone conversation state monitoring part 2 receives the telephone conversation disconnection information from the switchboard 7, the telephone conversation state monitoring part 2 updates the telephone conversation state in the entry of the telephone conversation to "disconnection".

The sharing space generating part 3 generates a file sharing space to be shared by speakers in each telephone conversation represented by the telephone conversation state data in the file sharing server 8. As the file sharing space, for example, a folder is generated in the recording part 17 of the file sharing server 8. In the present embodiment, although an example in which a folder is created as a file sharing space is described, the form of the file sharing space is not limited to a folder. For example, a predetermined logical memory area such as a directory, a file, or a Web page can be created as the file sharing space.

The sharing space generating part 3 generates a sharing space ID for identifying the generated file sharing space. The sharing space generating part 3 generates association data in which the sharing space ID is associated with information for specifying speakers who share the file sharing space represented by the sharing space ID, and records it in the recording part 9. The information for specifying a telephone conversation is, for example, telephone numbers and the like of speakers on both sides in the telephone conversation.

FIG. 2B shows exemplary association data. In the example shown in FIG. 2B, a sharing space ID, and telephone numbers of speakers I, II on both sides sharing a file sharing space represented by the sharing space ID are recorded in the association data.

The sharing space deleting part 4 deletes the file sharing space generated in the recording part 17 of the file sharing server 8 by the sharing space generating part 3.

The access control part 5 controls access from the data communication terminals 15a, 15b to the file sharing space, based on the speaker data and the association data recorded in the recording part 9.

The speaker data is information regarding a speaker specified by the telephone conversation state data. The speaker data contains, for example, a mail address of a speaker, a user ID, and the like. The speaker data is previously recorded in the recording part 9, for example, by speakers through the data communication terminals 15a, 15b. More specifically, the speaker data contains information for performing data communication with the speakers through the data communication terminals 15a, 15b.

FIG. 2C shows exemplary speaker data. In the example shown in FIG. 2C, a telephone number specifying a speaker, and a mail address of the speaker specified by the telephone number are recorded so as to be associated with each other in the speaker data.

The access control part 5 refers to the association data to obtain telephone numbers of speakers sharing a file sharing space for each file sharing space. Furthermore, the access control part 5 obtains information such as mail addresses for transmitting data to the data communication terminals 15a, 15b of the speakers sharing each file sharing space, from the speaker data.

The access control part 5 transmits access information for accessing each file sharing space to the data communication terminals 15a, 15b of speakers sharing each file sharing space, using the mail addresses obtained from the speaker data. The access information is, for example, a URL and the like of a file sharing space. Consequently, speakers sharing each file sharing space can access each file sharing space through the data communication terminals 15a, 15b.

The file sharing system 1 is composed of, for example, a computer such as a personal computer or a server. The functions of the telephone conversation state monitoring part 2, the sharing space generating part 3, the sharing space deleting part 4, and the access control part 5 can be realized when a CPU or an MPU of a computer executes a predetermined program. Furthermore, as the recording part 9, a hard disk provided in a computer, a semiconductor memory, a flexible disk, a DVD, or the like can be used.

The configuration of the file sharing system 1 is not limited to that shown in FIG. 1. For example, the file sharing server 8 and the file sharing system 1 can be constructed on one computer. Furthermore, the function of the file sharing system 1 may be distributed over a plurality of computers.

Figure 3:
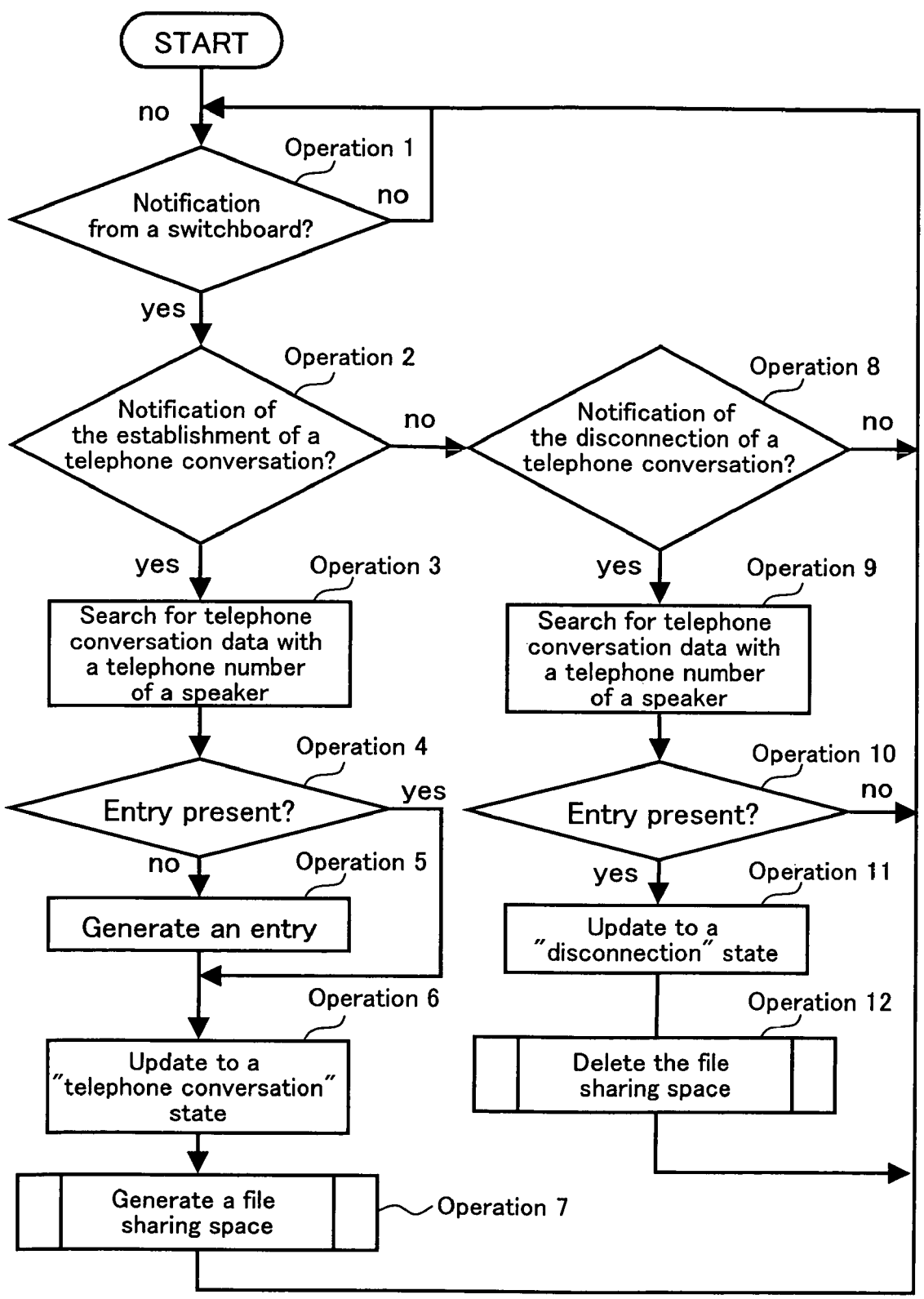
FIG. 3 is a flowchart showing exemplary processing in which a sharing space is generated or deleted based on a telephone conversation state monitored by a telephone conversion state monitoring part.

Next, the operation of the file sharing system 1 will be described. FIG. 3 is a flowchart showing exemplary processing in which a sharing space is generated or deleted based on the telephone conversation state monitored by the telephone conversation state monitoring part 2.

In the telephone network 11, in the case where a telephone conversation is established or disconnected, the telephone conversation state monitoring part 2 is notified of the establishment or disconnection of a telephone conversation from the switchboard 7. The notification of the establishment of a telephone conversation includes the notification of telephone numbers of the telephone conversation terminals 6a, 6b of speakers on both sides in the established telephone conversation. The notification of the disconnection of the telephone conversation includes the notification of telephone numbers of the telephone conversation terminals 6a, 6b of speakers on both sides in the disconnected telephone conversation.

The telephone conversation state monitoring part 2 awaits the notification from the switchboard 7 (Operation 1). In the case of detecting the notification from the switchboard 7 (Yes in Operation 1), the telephone conversation state monitoring part 2 determines whether or not the notification is related to the establishment of a telephone conversation (Operation 2).

In the case where the notification is related to the establishment of a telephone conversation (Yes in Operation 2), the telephone conversation state monitoring part 2 searches for telephone conversation state data with the telephone numbers of the telephone conversation terminals 6a, 6b on both sides in the established telephone conversation (Operation 3). The telephone conversation state data is, for example, a collection of entries including a telephone conversation state and telephone numbers of the speakers I, II.

As a result of the search, in the case where there is no entry, which includes the telephone numbers of the telephone communication terminals 6a, 6b on both sides in the telephone conversation, in the telephone conversation state data (No in Operation 4), the telephone conversation state monitoring part 2 generates an entry in which the telephone numbers of the telephone conversation terminals 6a, 6b on both sides in the established telephone conversation are those of the speakers I, II, and adds it to the telephone conversation state data (Operation 5).

The telephone conversation state monitoring part 2 updates the state of the entry added in Operation 5 to "during a telephone conversation" (Operation 6). After this, the sharing space generating part 3 generates a file sharing space to be shared by the speakers on both sides in the established telephone conversation in the recording part 17 of the file sharing server 8 (Operation 7). The detail of the file sharing space generation processing will be described later.

In the case where the notification received from the switchboard 7 is not the notification of the establishment of a telephone conversation (No in Operation 2), the telephone conversation state monitoring part 2 determines whether or not the notification is related to the disconnection of a telephone conversation (Operation 8). In the case where the notification is not related to the disconnection of a telephone conversation, either (No in Operation 8), the telephone conversation state monitoring part 2 awaits a subsequent notification.

In the case where the notification is related to the disconnection of a telephone conversation (Yes in Operation 8), the notification state monitoring part 2 searches for telephone conversation state data with the telephone numbers of the telephone conversation terminals on both sides in the disconnected telephone conversation (Operation 9). As a result of the search, in the case where there is no entry, which includes the telephone numbers of the telephone conversation terminals on both sides in the disconnected telephone conversation, in the telephone conversation state data, the telephone conversation state monitoring part 2 returns to await a notification (Operation 1).

As a result of the search, in the case where there is an entry, which includes the telephone numbers of the telephone conversation terminals on both sides in the disconnected telephone conversation, in the telephone conversation state data (Yes in Operation 10), the telephone conversation state of the entry is updated to "disconnection" (Operation 11). After this, the sharing space deleting part 4 deletes the file sharing space shared by the speakers on both sides of the disconnected telephone conversation from the file sharing server 8 (Operation 12). The detail of the file sharing space deletion processing will be described later.

In the processing of the flowchart shown in FIG. 3, when a file sharing space is generated, and a telephone conversation is disconnected at a time of the establishment of the telephone conversation, the file sharing space is deleted.

(Example of File Sharing Space Generation Processing)

Figure 4B:
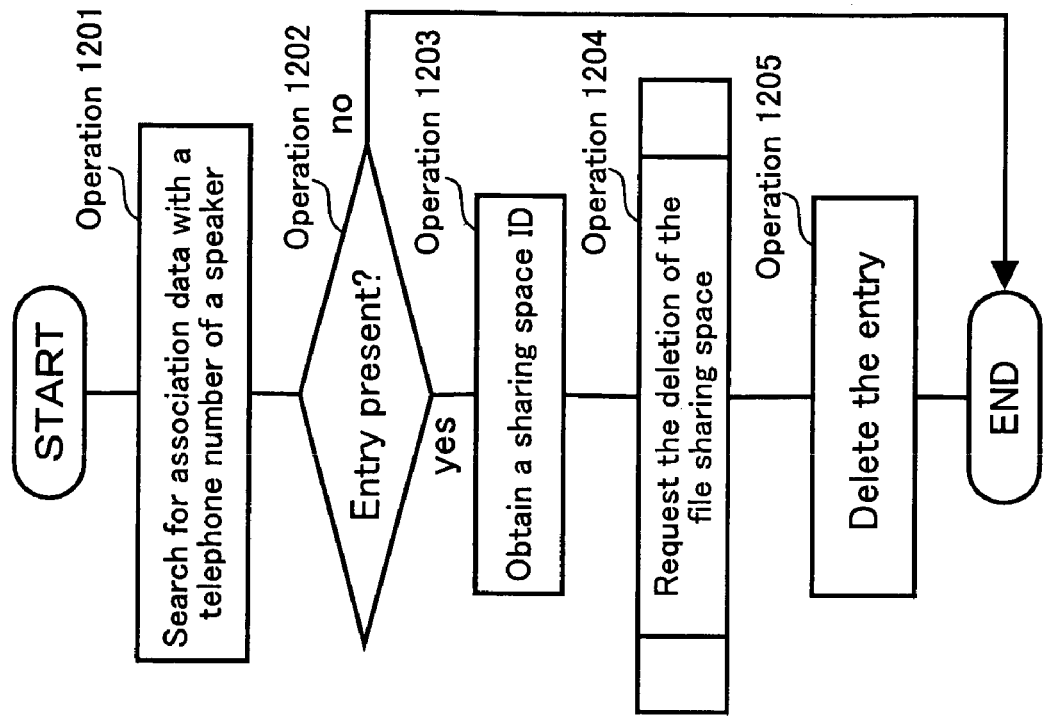
FIG. 4B is a flowchart showing exemplary processing in which a sharing space deleting part deletes a file sharing space.
Figure 4A:
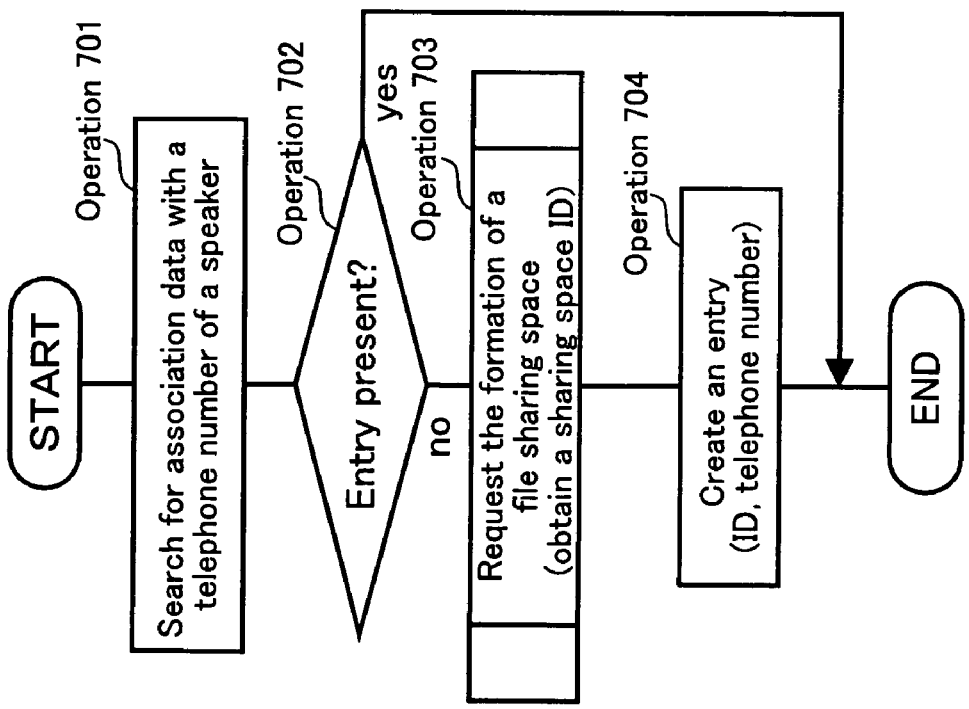
FIG. 4A is a flowchart showing exemplary processing in which a sharing space generating part generates a file sharing space.

Next, the processing in which the sharing space generating part 3 generates a file sharing space will be described. FIG. 4A is a flowchart showing exemplary processing in which the sharing space generating part 3 generates a file sharing space in the case where a telephone conversation is established by the telephone conversation terminals 6a, 6b of the speakers A, B in the telephone network 11 shown in FIG. 1 (Operation 7 in FIG. 3).

The sharing space generating part 3 obtains telephone numbers (for example, "0001", "0002") of the telephone conversation terminals 6a, 6b of the speakers A, B on both sides in an entry whose telephone conversation state is "during a telephone conversation" in the telephone conversation state data.

The sharing space generating part 3 searches for association data with the obtained telephone numbers on both sides (Operation 701). In the case where there is no entry including the speakers on both sides in the association data (No in Operation 702), the sharing space generating part 3 transmits a request signal for generating a file sharing space to the file sharing server 8 (Operation 703).

When the file sharing server 8 receives a request signal for generating a file sharing space, the file sharing server 8 generates a new folder as a file sharing space in the recording part 17. When the file sharing server 8 succeeds in generating a folder, the file sharing server 8 returns the sharing space ID for identifying the file sharing space to the sharing space generating part 3.

When the sharing space generating part 3 receives the sharing space ID of the generated file sharing space, the sharing space generating part 3 generates an entry with the sharing space ID and the telephone numbers "0001", "0002" of the telephone terminals 6a, 6b on both sides, and adds the entry to the association data (Operation 704). The association data shown in FIG. 2B is an exemplary entry to which an entry with the sharing space ID being "share001" is added. Because of this, data in which a newly generated file sharing space is associated with speakers sharing the file sharing space is added to the association data.

(Example of File Sharing Space Deletion Processing)

Next, the processing in which the sharing space deleting part 4 deletes a file sharing space will be described. FIG. 4B is a flowchart showing an example of processing in which, in the case where a telephone conversation by the telephone conversation terminals 6a, 6b of the speakers A, B is disconnected in the telephone network 11 shown in FIG. 1, the sharing space deleting part 4 deletes a file sharing space regarding the telephone conversation (Operation 12 in FIG. 3).

In the case where the telephone conversation by the telephone conversation terminals 6a, 6b is disconnected, the telephone conversation state in the entry including "0001", "0002" in the telephone numbers I, II is updated to "disconnection" in the telephone conversation state data shown in FIG. 2A. The sharing space deleting part 4 obtains the telephone numbers of the telephone conversation terminals 6a, 6b on both sides in the telephone conversation represented by the entry in which the state is "disconnection" in the telephone conversation state data.

The sharing space deleting part 4 searches for association data with the obtained telephone numbers (Operation 1201). In the case where there is an entry, which includes the telephone numbers matched with those of the telephone conversation terminals 6a, 6b on both sides in the association data (Yes in Operation 1202), the sharing space deleting part 4 obtains a sharing space ID of the entry (Operation 1203). In the example shown in FIG. 2B, the sharing space ID is "share001". The sharing space deleting part 4 transmits the obtained sharing space ID and a request signal of deleting the file sharing space to the file sharing server 8 (Operation 1204).

When the file sharing server 8 receives the sharing space ID and the request signal for deleting the file sharing space, the file sharing server 8 deletes a folder corresponding to the file sharing space represented by the sharing space ID from the recording part 17. When the file sharing server 8 succeeds in deleting a folder, the file sharing server 8 returns a signal representing the success of deletion to the sharing space deleting part 4.

The sharing space deleting part 4 that has received the signal representing the success of deletion deletes the entry including the sharing space ID representing the deleted file sharing space from the association data (Operation 1205). In the example shown in FIG. 2B, an entry of the sharing space ID "share0001" is deleted.

In the processing shown in FIG. 4B, in the case where a file sharing space has been generated regarding a telephone conversation, when the telephone conversation is disconnected, the file sharing space generated regarding the telephone conversation is deleted. Therefore, the speakers on both sides can use a file sharing space only during a telephone conversation.

(Example of Access Control Processing by Mail Transmission)

Figure 5:
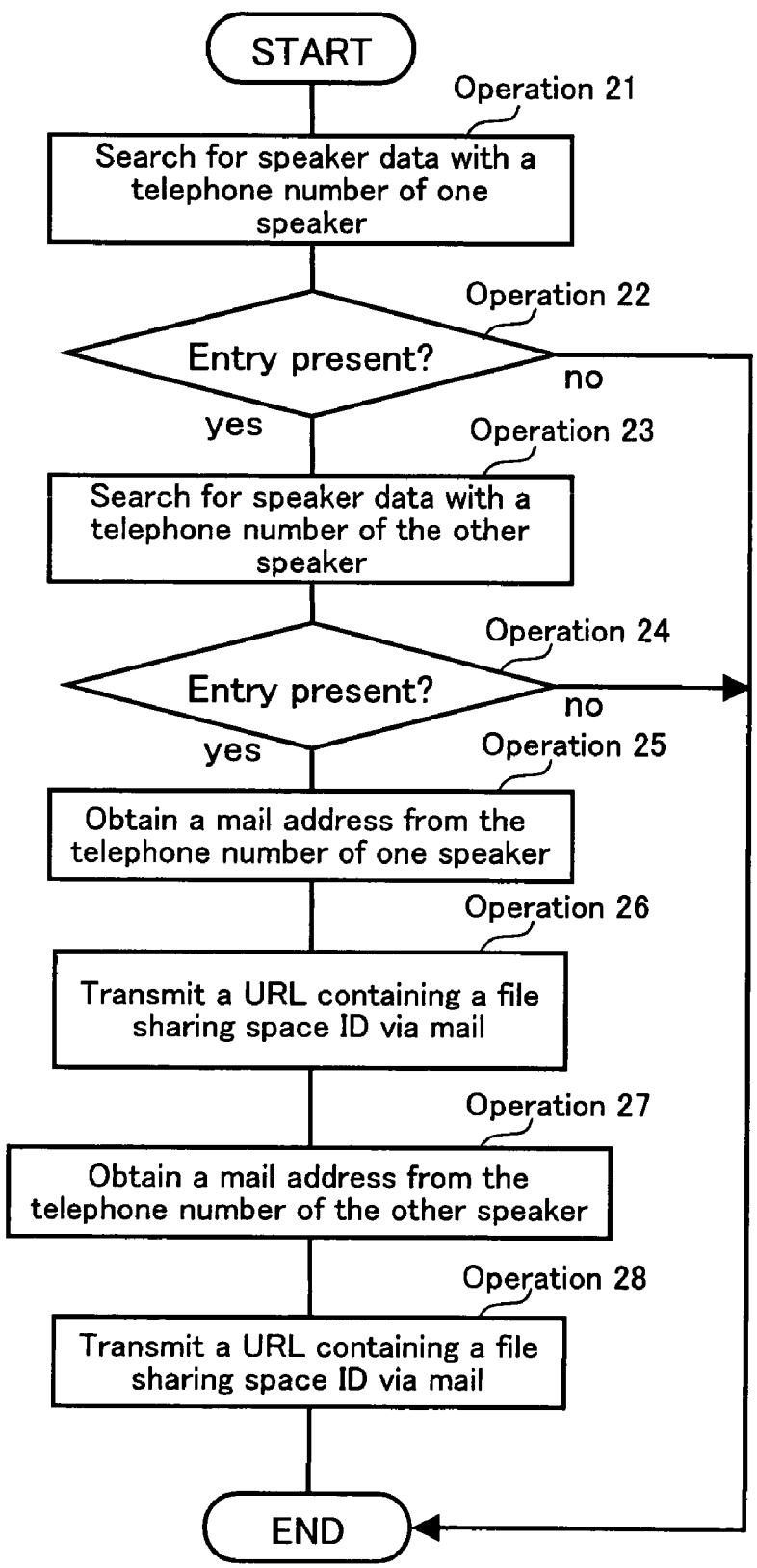
FIG. 5 is a flow chart showing exemplary processing in which an access control part performs access control.

The access to the file sharing space generated by the sharing space generating part 3 is controlled by the access control part 5. FIG. 5 is a flowchart showing exemplary processing in which the access control part 5 performs access control so that the speakers A, B of the telephone conversation between the telephone conversation terminals 6a, 6b shown in FIG. 1 can access the file sharing space generated regarding the telephone conversation, using the data communication terminals 15a, 15b.

Herein, an exemplary case will be described in which the sharing space ID "share0001" of the file sharing space generated by the sharing space generating part 3, and the telephone numbers "0001", "0002" of the telephone conversation terminals 6a, 6b on both sides are added to the association data shown in FIG. 2B.

The access control part 5 refers to the association data to obtain the telephone numbers "0001", "0002" of the speakers A, B on both sides from an entry of the sharing space ID "share0001".

The access control part 5 searches for speaker data with the telephone number "0001" of one telephone conversation terminal 6*a* (Operation 21). The speaker data represents, for example, as shown in FIG. 2C, the correspondence between telephone numbers and mail addresses. If there is no entry including the telephone number of the telephone conversation terminal 6*a* (No in Operation 22), access control is impossible, so that the processing is completed.

In the case where there is an entry including the telephone number "0001" of the telephone conversation terminal 6*a* (Yes in Operation 22), the access control part 5 searches for telephone conversation data with the telephone number "0002" of the other telephone conversation terminal 6*b* (Operation 23). If there is no telephone number "0002" of the telephone conversation terminal 6*b*, the processing is completed.

In the case where the telephone number "0002" is also present (Yes in Operation 24), the access control part 5 obtains a mail address of the speaker A of the telephone conversation terminal 6*a* with a telephone number being "0001" from the speaker data (Operation 25).

The access control part 5 transmits data for enabling the speaker A to access a file sharing space represented by the sharing space ID "share0001" with the mail address of one speaker A being a destination (Operation 26). For example, the access control part 5 transmits a URL representing the location of a file in the file sharing space represented by the file space ID "share0001" to the mail address of the speaker A. The URL may contain the sharing space ID "share0001" as a parameter.

Because of this, the speaker A can obtain information for accessing the file sharing space via mail using the data communication terminal 15*a*. Therefore, the speaker A can access the file sharing space represented by the URL sent via mail using the data communication terminal 15*a*.

Similarly, the access control part 5 obtains a mail address of the other speaker B (Operation 27), and transmits information for accessing a file sharing space represented by the sharing space "share0001" with the mail address being a destination.

The access control part 5 transmits data for accessing the file sharing space to the mail address of the other speaker B with the mail address of the speaker B being a destination (Operation 28). The speaker B also can obtain information for accessing the file sharing space via mail using the data communication terminal 15*b*.

Figure 6A:
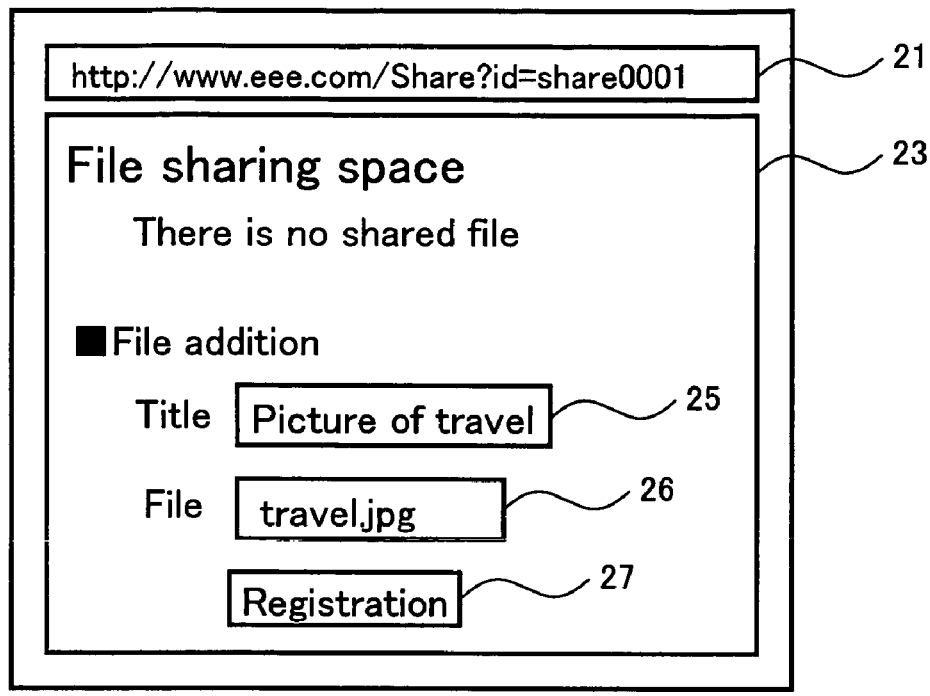
FIG. 6A shows an exemplary screen displayed at a data communication terminal.

FIG. 6A shows an example of a screen displayed in the case where the speaker A accesses the file sharing space of the URL sent via mail in the data communication terminal 15*a*. The screen shown in FIG. 6A is displayed by the function of, for example, a Web browser mounted on the data communication terminal 15*a*.

On the screen shown in FIG. 6A, a URL input area 21, a content display area 23, a title input area 25, a file name input area 26, and a registration button 27 are displayed. The speaker A can access the file sharing space, for example, by inputting the URL sent via mail in the URL input area 21. In the content display area 23, a file of the file sharing space is displayed. In the example shown in FIG. 6A, there is no file to be shared in the file sharing space, so that "there is no shared file".

Furthermore, in the case where the speaker A desires to add a shared file to the file sharing space, for example, the speaker A inputs the title of a shared file in the title input area 25 and the file name of the file to be added in the file name input area 26, and clicks on a registration button, thereby adding the shared file.

For example, in the case where the file name of a file recorded in the data communication terminal 15*a* is inputted in the file name input area 26, and the registration button is clicked, the Web browser transmits the title and the file to the file sharing server by, for example, a POST method of an HTTP protocol. The Web browser may cause a file transfer module provided in the data communication terminal 15*a* to transfer the file of the inputted file name from the data communication terminal 15*a* to the file sharing space represented by the URL inputted in the URL input area.

Figure 6B:
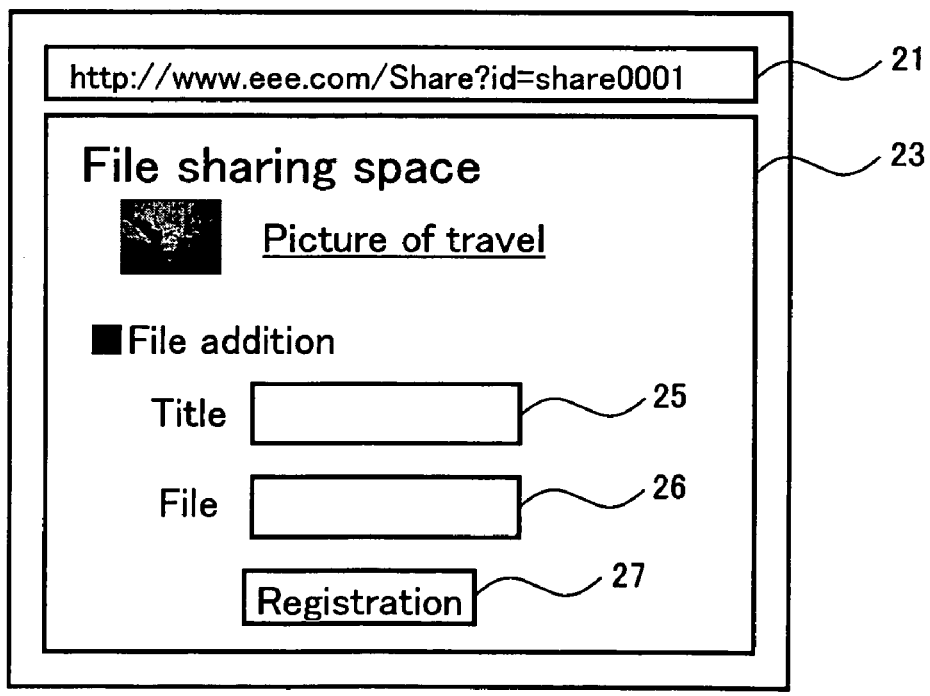
FIG. 6B shows an exemplary screen displayed in the case where a display of a content display area is updated.

FIG. 6B shows an exemplary screen displayed in the case where the display of the content display area is updated after the addition of a file. FIG. 6B shows an exemplary case in which, in the case where the added shared file is an image file, the title and the thumb nail of the image are displayed.

As described above, the speaker A can access the file sharing space using the data communication terminal 15*a*. The other speaker B can also access the file sharing space. Furthermore, the screens shown in FIGS. 6A and 6B are merely examples, and the display form of the screen is not limited thereto.

In the processing shown in FIG. 4B, when a telephone conversation is disconnected, a file sharing space in the telephone conversation is deleted. However, the timing at which the sharing space deleting part 4 deletes a file sharing space is not limited to the time of disconnecting a telephone conversation. For example, the sharing space deleting part 4 can delete a file sharing space after the elapse of a predetermined time from the disconnection of a telephone conversation.

Figure 7:
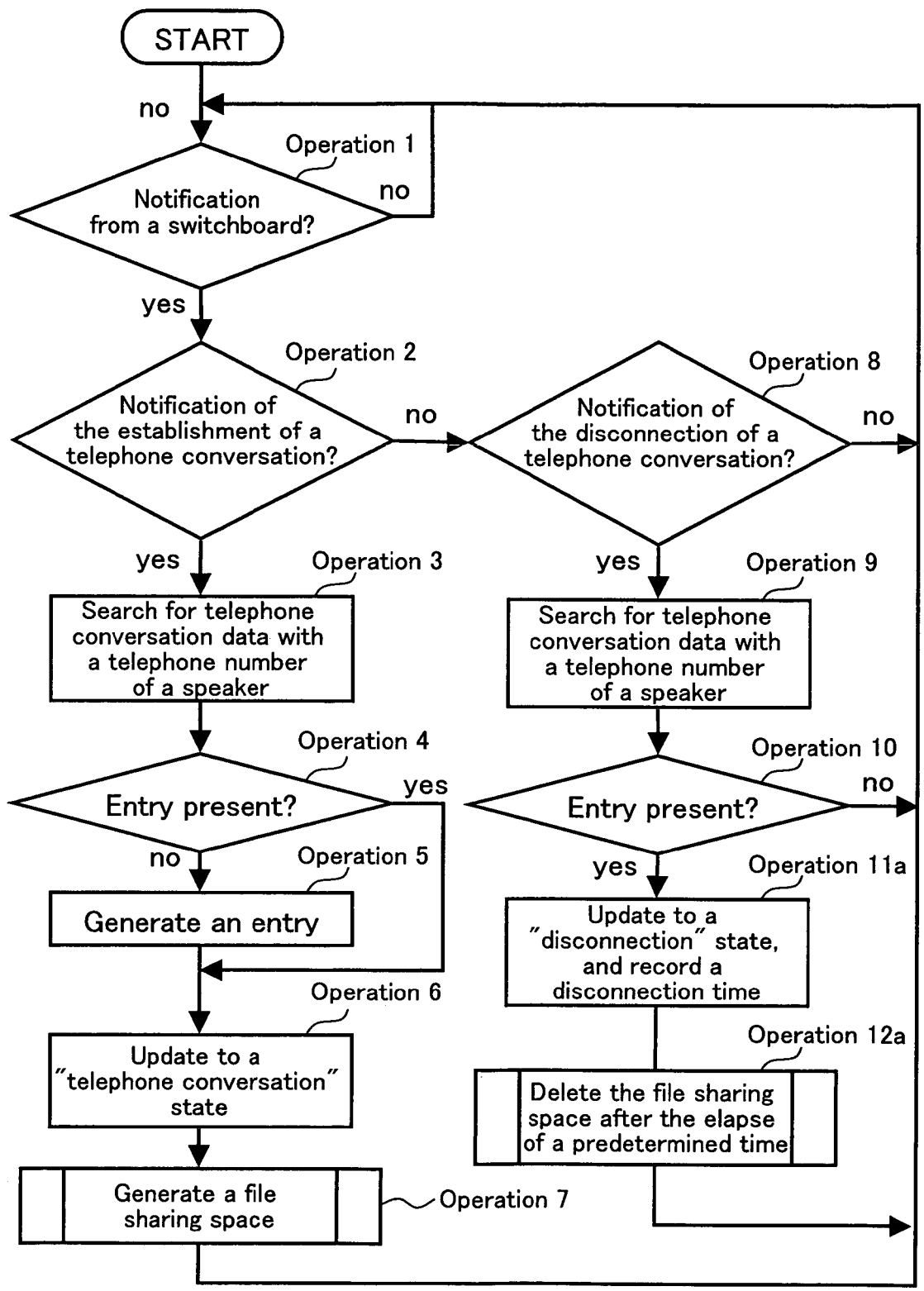
FIG. 7 is a flowchart showing exemplary processing in which the sharing space deleting part deletes a file sharing space after the elapse of a predetermined time from the disconnection of a telephone conversation.

FIG. 7 is a flowchart showing exemplary processing in which the sharing space deleting part 4 deletes a file sharing space after the elapse of a predetermined time from the disconnection of a telephone conversation. In the processing shown in FIG. 7, the same operations as those in the processing shown in FIG. 3 are denoted with the same reference numerals as those therein, and the description thereof will be omitted.

In the processing shown in FIG. 7, in Operation 10, in the case where there is an entry of telephone numbers matched with those of speakers on both sides in a disconnected telephone conversation in telephone conversation state data (Yes in Operation 10), the telephone conversation state monitoring part 2 updates the state of the entry to "disconnection", and records a disconnection time in the entry (Operation 11*a*).

FIG. 8 shows an example of telephone conversation state data in the case where a disconnection time is recorded. In the example shown in FIG. 8, a disconnection time is further recorded for each telephone conversation.

The sharing space deleting part 4 refers to the telephone conversation state data as shown in FIG. 8, extracts a telephone conversation after the elapse of a predetermined time from the disconnection time, and deletes a file sharing space regarding the telephone conversation. The processing of deleting the sharing space is similar to that shown in FIG. 4B.

In the processing shown in FIG. 7, the file sharing space is deleted after the elapse of a predetermined time from the disconnection of a telephone conversation, so that a speaker can access the file sharing space for a predetermined time even after the telephone conversation is completed. Therefore, for example, even in the case where a telephone conversation is disconnected for an unexpected reason, such as the situation in which radio waves do not reach a mobile telephone during a telephone conversation, a speaker will not be unable to access a file sharing space immediately.

Embodiment 2

In the file sharing system 1 in the present embodiment, in the configuration shown in FIG. 1, the processing of the telephone conversation state monitoring part 2 and the access control part 5 is different from that in Embodiment 1. Furthermore, in the file sharing system 1 in the present embodiment, the configuration of speaker data is also different from that in Embodiment 1.

FIG. 9 shows a configuration of speaker data in the present embodiment. In the speaker data shown in FIG. 9, telephone numbers for identifying telephone conversation terminals of speakers and user IDs for speakers to log in the file sharing server 8 are recorded so as to be associated with each other.

When a speaker logs in the file sharing server from a data communication terminal, using a user ID, the access control part 5 in the present embodiment obtains a telephone number of the speaker represented by the user ID from the speaker data. The access control part 5 obtains data representing a telephone conversation state of the speaker from the telephone conversation state data, using the telephone number of the speaker who has logged in. In the case where the speaker who has logged in is having a telephone conversation, the access control part 5 obtains a sharing space ID identifying the file sharing space of the telephone conversation performed by the speaker from the association data. Therefore, the access control part 5 enables the speaker who has logged in the file sharing server using the data communication terminal to access the file sharing space represented by the sharing space ID. Consequently, only the speakers sharing the file sharing space can access the file sharing space.

Figure 10:
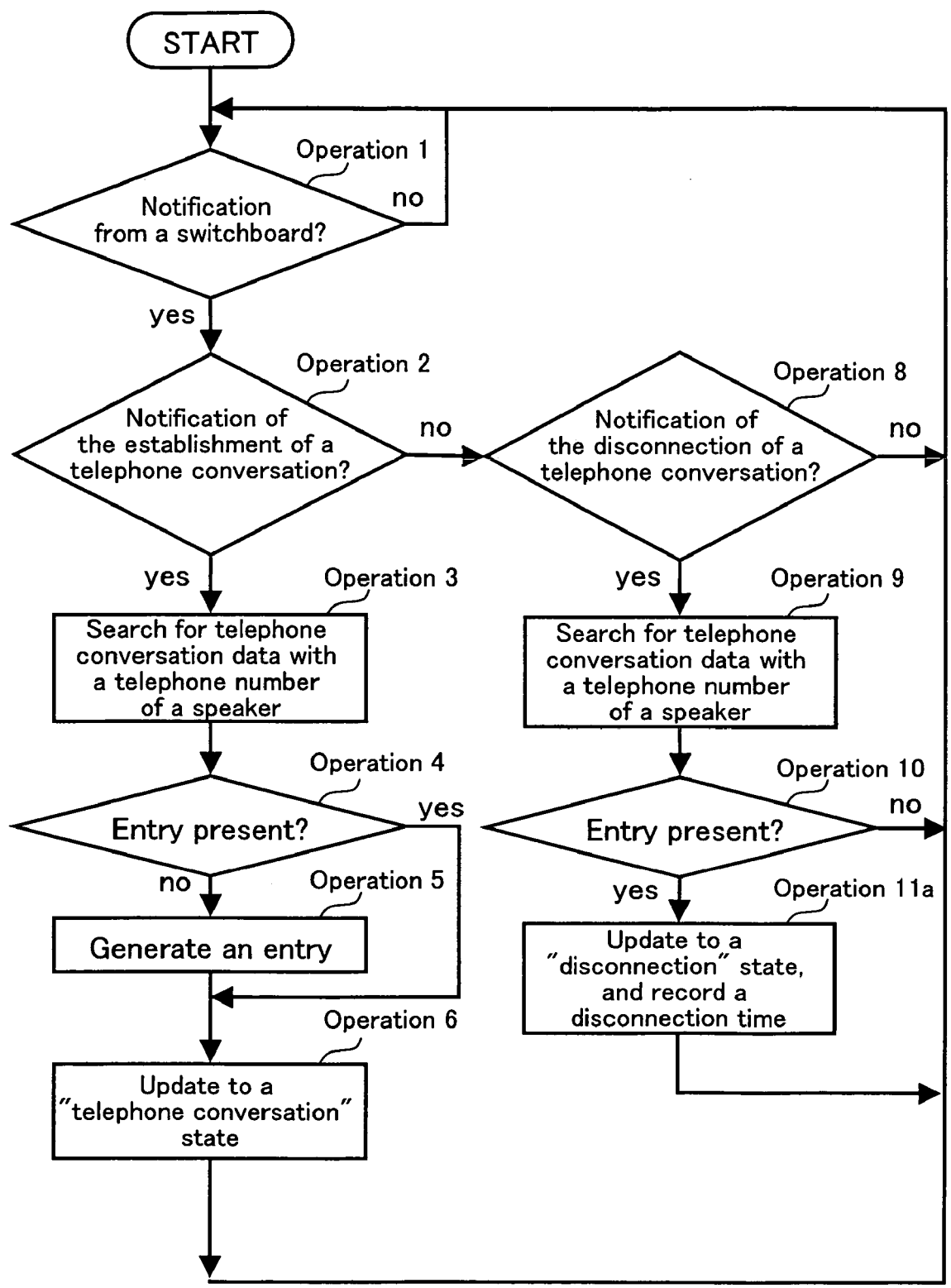
FIG. 10 is a flowchart showing exemplary processing in which a telephone conversation state monitoring part monitors.

Next, the operation of the file sharing system in the present embodiment will be described. FIG. 10 is a flowchart showing exemplary processing in which a sharing space is generated or deleted based on the telephone conversation state monitored by the telephone conversation state monitoring part 2 in the present embodiment. In the processing shown in FIG. 10, the same operations as those in the processing shown in FIG. 3 are denoted with the same reference numerals as those therein, and the description thereof will be omitted.

In the processing shown in FIG. 10, after there is a notification of the establishment of a telephone conversation (Yes in Operation 2), an entry showing the telephone conversation is generated in the telephone conversation state data (Operation 5), and the state of the entry is updated to "during a telephone conversation" (Operation 6), the sharing space generating part 3 does not generate a file sharing space (Operation 7 in FIG. 2). Instead of that, a file sharing space is generated in the case where there is access from the data communication terminal of a speaker to the file sharing server. The processing in the case of generating a file sharing space will be described later.

Furthermore, in the case where the telephone conversation state monitoring part 2 is notified of the disconnection of the telephone conversation (Yes in Operation 8), the telephone conversation state monitoring part 2 updates the state of the entry to "disconnection", and records a disconnection time in the entry (Operation 11a). Furthermore, the sharing space deletion processing (Operation 12 in FIG. 2) is not performed.

Figure 11:
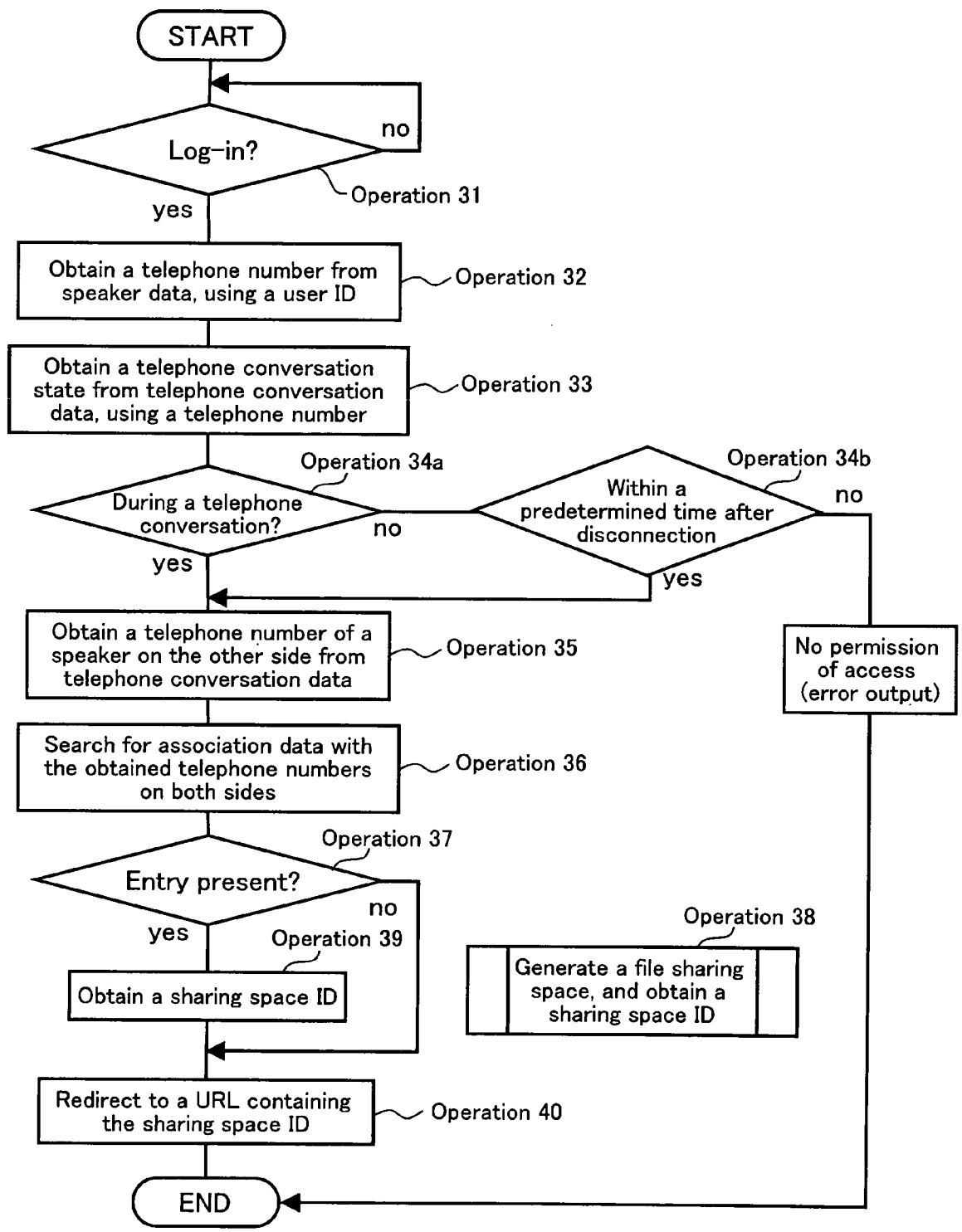
FIG. 11 is a flowchart showing exemplary processing in the case where there is a log-in from a speaker.

FIG. 11 is a flowchart showing exemplary processing performed by the access control part 5 in the case where the speaker A logs in the file sharing server 8 from the data communication terminal 15a. As shown in FIG. 11, the access control part 5 is on standby until there is a log-in with respect to the file sharing server 8 (Operation 31). For example, the speaker A logs in the file sharing server 8 via the Internet 13 using the data communication terminal 15a during a telephone conversation with the speaker B at the telephone conversation terminal 6a. The speaker A inputs a user ID when logging in.

When there is a log-in with respect to the file sharing server 8, the access control part 5 obtains, for example, a telephone number of the speaker A having a user ID at a time of the log-in from the telephone conversation data, using the user ID at a time of the log-in. For example, in the case where the user ID inputted by the speaker A at a time of the log-in is "Sato", the access control part 5 obtains a telephone number "0001" from the speaker data shown in FIG. 9.

The access control part 5 searches for, for example, an entry including a telephone number obtained from the telephone conversation state data, and obtains the state of the entry (Operation 33). For example, in the of the obtained telephone number "0001", the access control part 5 obtains "during a telephone conversation" as a telephone conversation state from the telephone conversation state data shown in FIG. 8.

Thus, in the case where the telephone conversation by the telephone conversation terminal of the telephone number corresponding to the user ID at a time of the log-in is "during a telephone conversation" (Yes in Operation 34a), the access control part 5 obtains a telephone number of a party on the other side during the telephone conversation from the telephone conversation state data (Operation 35). For example, the access control part 5 obtains the telephone number "0002" of the party on the other side from the telephone conversation state data shown in FIG. 8. The access control part 5 searches for association data with the obtained telephone numbers "0001" and "0002" on both sides (Operation 36). At a time when the speaker A initially logs in the file sharing server after the commencement of the telephone conversation between the speakers A and B, a file sharing space between the speakers A and B has not been generated, so that there is no corresponding entry even in the association data.

In the case where there is no entry including the telephone numbers on both sides (Yes in Operation 37), the sharing space generating part 3 generates a file sharing space in the recording part 17 of the file sharing server. The access control part 5 obtains a sharing space ID of the generated file sharing space (Operation 38).

In Operation 37, if a file sharing space between the speakers A and B has already been generated, and there is an entry including the telephone numbers on both sides in the association data (Yes in Operation 37), the access control part 5 obtains a sharing space ID "share0001" of the entry (Operation 39).

The access control part 5 redirects access by the speaker A from the data communication terminal 15a to the file sharing space represented by the sharing space ID obtained in Operation 38 or 39. More specifically, the access control part 5 transmits a URL representing the location of the sharing space ID to the data communication terminal 15a of the speaker A. Because of this, the data communication terminal 15a of the speaker A can obtain data in the file sharing space represented by the URL.

In Operation 34a, if the telephone conversation state obtained by the access control part 5 is "disconnection" (No in Operation 34a), the access control part 5 obtains a disconnection time from the entry to determine whether or not a predetermined time has elapsed after the disconnection (Operation 34b). In the case where a predetermined time has not elapsed after the disconnection (Yes in Operation 34*b*), the processing after Operation 35 and subsequent operations are performed as described above.

In the case where a predetermined time has elapsed after the disconnection (No in Operation 34*b*), the access control part 5 returns an error message showing that access to the file sharing server 8 is not permitted to the data communication terminal 15*a*. Furthermore, even in the case where there is no entry, an error message is similarly returned to the data communication terminal 15*a*.

In the processing shown in FIG. 11, during a telephone conversation or within a predetermined time after the disconnection of a telephone conversation, a file sharing space is generated when either one speaker logs in the file sharing server 8. The speaker who has logged in can access the file sharing space since the access thereof is redirected to the file sharing space. After this, even in the case where the other speaker logs in during a telephone conversation or within a predetermined time after the disconnection of a telephone conversation, thereby accessing the file sharing server 8, the access is redirected to the file sharing space, so that the other speaker can access the file sharing space.

Embodiment 3

The present embodiment is a modified example of the processing of the telephone conversation state monitoring part 2 in the file sharing system 1 shown in FIG. 1.

Figure 12:
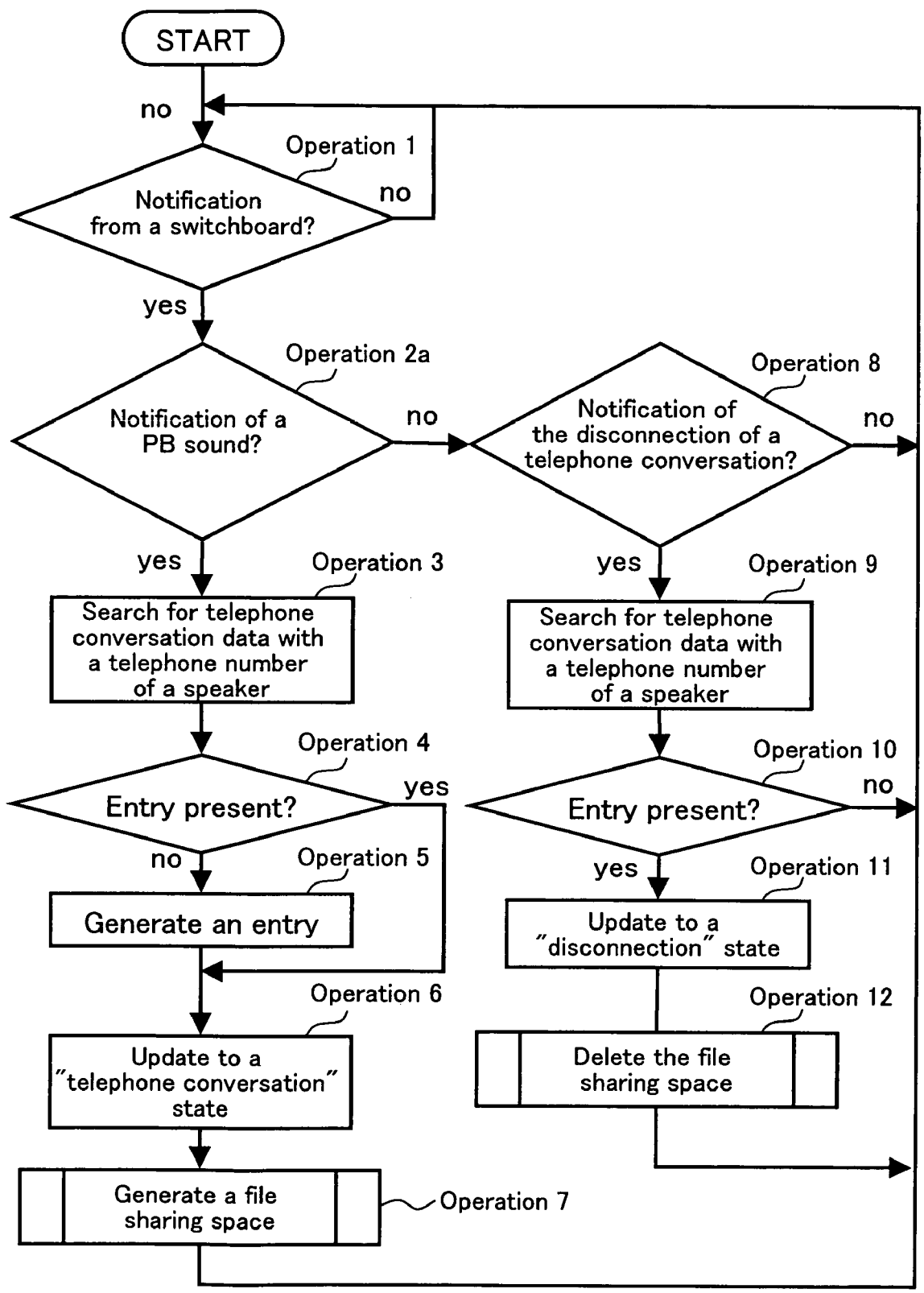
FIG. 12 is a flowchart showing exemplary processing in which the telephone conversation state monitoring part monitors a telephone conversation state.

FIG. 12 is a flowchart showing exemplary processing in which a sharing space is generated or deleted based on the telephone conversation state monitored by the telephone conversation state monitoring part 2 in the present embodiment. In the processing shown in FIG. 12, the same operations as those in the processing shown in FIG. 3 are denoted with the same reference numerals as those therein, and the description thereof will be omitted.

The processing shown in FIG. 12 is different from that shown in FIG. 3 in Operation 2*a*. In the processing shown in FIG. 3, the telephone conversation state monitoring part 2 performs the processing in Operations 3 to 7 in the case of being notified of the establishment of a telephone conversation. However, in the processing shown in FIG. 12, the telephone conversation state monitoring part 2 performs Operations 3 to 7 when being notified of a push button (PB) sound sent from the telephone conversation terminal.

The PB sound is a kind of a signal transmitted by a speaker when the speaker operates a telephone conversation terminal during a telephone conversation. For example, the PB sound is sent when the speaker presses a button of a telephone during a telephone conversation. The PB sound may also be called a PB signal or a tone signal.

The example shown in FIG. 12 is predicated on that the telephone conversation state monitoring part 2 also receives a telephone number of a speaker when being notified of a PB sound. However, the telephone conversation state monitoring part 2 may obtain a telephone number after being notified of the PB sound. For example, when being notified of a PB sound, the telephone conversation state monitoring part 2 first receives a telephone conversation identifier showing in which telephone conversation the PB sound is received. After this, the telephone conversation state monitoring part 2 can obtain a telephone number of a speaker during the telephone conversation represented by the telephone conversation identifier from data recorded in the switchboard 7, using the received telephone conversation identifier.

In the processing shown in FIG. 12, in the case where a speaker designates the generation of a file sharing space to a telephone conversation terminal with a PB sound, a file sharing space is generated. More specifically, the speaker can transmit a signal designating the generation of a file sharing space with a PB sound. In the case where the speaker does not require the generation of a file sharing space, a file sharing space is not generated.

In the present embodiment, the processing has been illustrated, in which a file sharing space is generated in the case where the telephone conversation state monitoring part 2 is notified of a PB sound transmitted from the telephone conversation terminal. However, the processing can also be similarly performed, in which a file sharing space is generated, for example, in the case where the telephone conversation state monitoring part 2 is notified that a particular voice of a speaker is recognized.

Embodiment 4

The present embodiment is a modified example of the processing of the telephone conversation state monitoring part 2 in the file sharing system 1 shown in FIG. 1.

Figure 13:
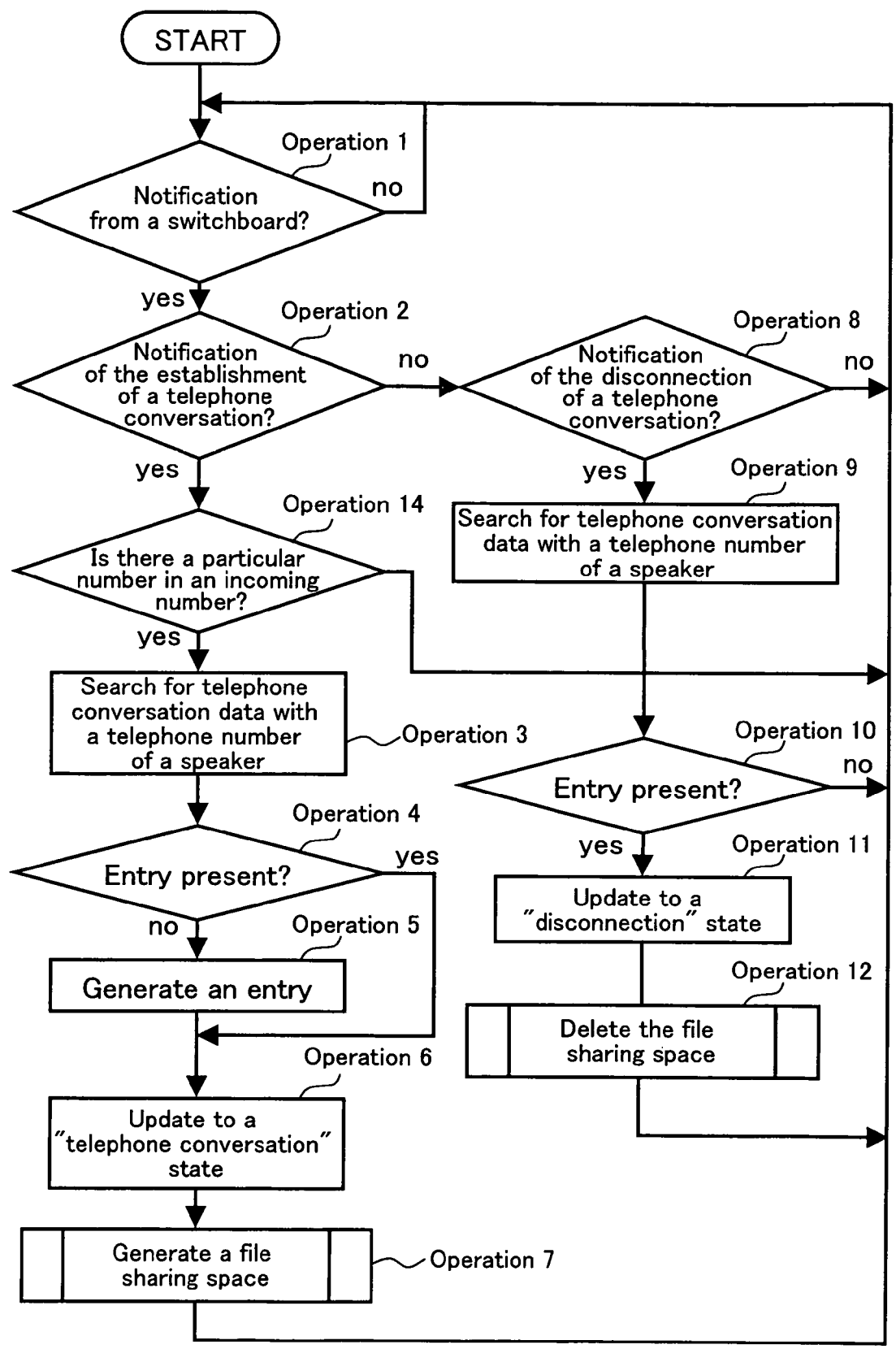
FIG. 13 is a flowchart showing exemplary processing in which the telephone conversation state monitoring part monitors a telephone conversation state.

FIG. 13 is a flowchart showing exemplary processing in which a sharing space is generated or deleted based on the telephone conversation state monitored by the telephone conversation state monitoring part 2 in the present embodiment. In the processing shown in FIG. 13, the same operations as those in the processing shown in FIG. 3 are denoted with the same reference numerals as those therein, and the description thereof will be omitted.

The processing shown in FIG. 13 is different from that shown in FIG. 3 in that the processing of Operation 14 is performed between Operations 2 and 3. In the processing shown in FIG. 12, in the case where the telephone conversation state monitoring part 2 is notified of the establishment of a telephone conversation (Yes in Operation 2), the telephone conversation state monitoring part 2 determines whether or not a particular number is included before or after the received telephone number (Operation 14).

The particular number is an identification number of a particular application, and for example, sent when a speaker operates a telephone conversation terminal for starting a call. When the speaker makes a call to a telephone number "0001" of a party on the other side, the speaker adds, for example, "199" as a particular number, and inputs a number "1990001" at a communication terminal. In the case where a call is made with, for example, "199" added to a telephone number, it is previously determined as a rule of a telephone conversation in the telephone network 11 that a file sharing space is created. More specifically, for example, "199" can be set to be a particular number for creating a file sharing space.

Furthermore, there may be the case where a speaker makes a call with a particular number "199", reaches service corresponding to the particular number, and thereafter, inputs a telephone number "0001" of a party on the other side.

Even in the processing shown in FIG. 13, in the case where a particular number is included (Yes in Operation 14), the processing in Operations 3 to 7 are performed. Therefore, in the case where the speaker inputs a particular number, a file sharing space is generated. More specifically, the speaker can transmit the instruction of generating a file sharing space with a particular number.

Embodiment 5

Figure 14:
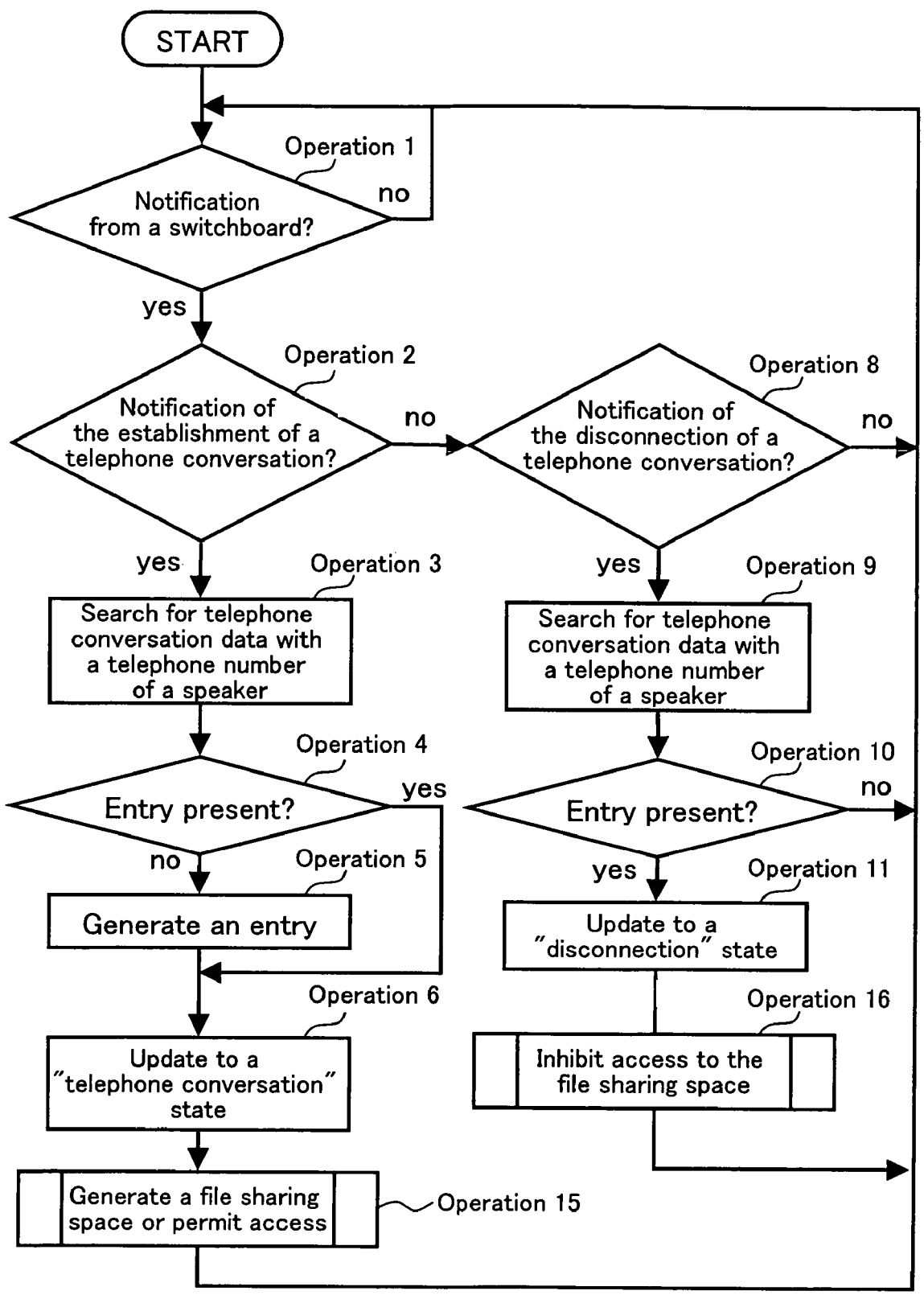
FIG. 14 shows exemplary processing in the present embodiment in which the telephone conversation state monitoring part monitors a telephone conversation state, and the generation of a file sharing space, the access inhibition or access permission with respect to the file sharing space are performed in accordance with the telephone conversation state.

FIG. 14 is a flowchart showing exemplary processing in the present embodiment in which the telephone conversation state monitoring part 2 monitors a telephone conversation state, and the generation of a file sharing space, and the access inhibition or access permission with respect to the file sharing space are performed depending upon a telephone conversation state. In FIG. 14, the same operations as those in FIG. 3 are denoted with the same reference numerals as those therein, and the description thereof will be omitted.

In the processing shown in FIG. 14, in the case where the telephone conversation state monitoring part 2 is notified of the establishment of a telephone conversation (Yes in Operation 2), the sharing space generating part 3 generates a file sharing space or permits access to the file sharing space (Operation 15).

Furthermore, in the case where the telephone conversation state monitoring part 2 is notified of the disconnection of a telephone conversation (Yes in Operation 8), the access control part 5 inhibits access to the file sharing space (Operation 16).

Figure 15:
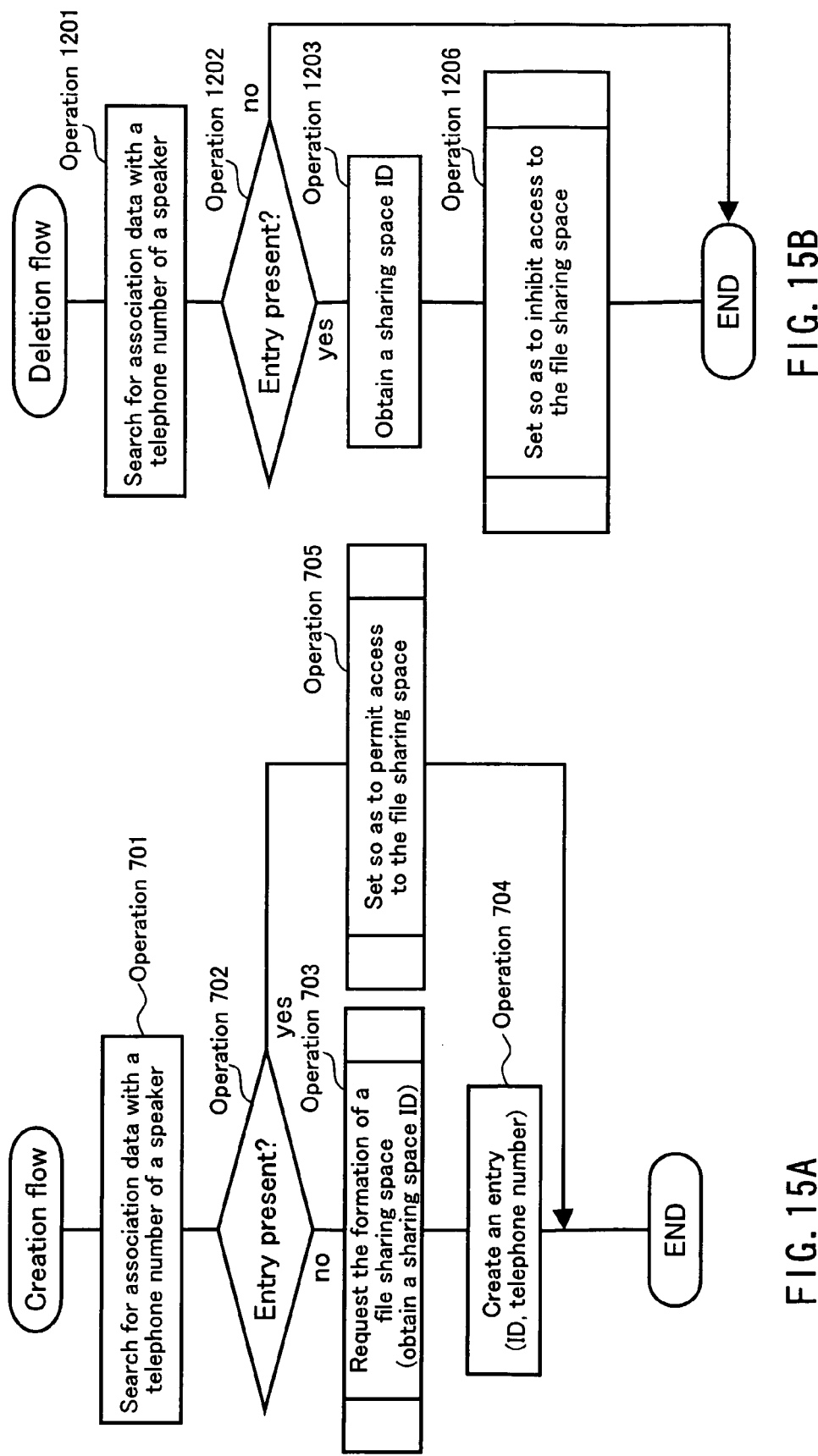
FIG. 15A is a flowchart showing an example of file sharing space generation processing in the present embodiment.
FIG. 15B is a flowchart showing an example of file sharing space deletion processing in the present embodiment.

FIG. 15A is a flowchart showing an example of the file sharing space generation or the file sharing space access permission processing (Operation 15 in FIG. 14) in the present embodiment. FIG. 15B is a flowchart showing an example of file sharing space access inhibition processing in the present embodiment. In FIGS. 15A, 15B, the same operations as those in the processing shown in FIGS. 4A, 4B are denoted with the same reference numerals as those therein, and the description thereof will be omitted.

In the sharing space generation processing shown in FIG. 15A, in the case where an entry including telephone numbers of speakers on both sides in an established telephone conversation is present in association data (Yes in Operation 702), the sharing space generating part 3 obtains a sharing space ID of the entry. The sharing space generating part 3 requests the access control part 5 to set so that speakers on both sides can access a file sharing space represented by the sharing space ID (Operation 705). For example, the access control part 5 sets the function of the file sharing server 8 so that the file sharing space represented by the obtained sharing space ID can be accessed from the data communication terminals 15a, 15b (Operation 705).

In the sharing space access inhibition processing shown in FIG. 15B, a file space is not deleted (Operation 1205 in FIG. 4B). Instead of that, the access control part 5 sets the function of the file sharing server 8 so that the access from the data communication terminals 15a, 15b to the file sharing space becomes impossible (Operation 1206).

For example, the access control part 5 can perform access control with an IP address, using an existing access control mechanism included in the function of a Web server provided in the file sharing server 8. The access control mechanism includes, for example, access control data representing whether or not a file sharing space recorded in the file sharing server 8 can be accessed. The access control part 5 can perform access control by updating access control data.

FIG. 16 shows an exemplary table constituting access control data. In the table shown in FIG. 16, a sharing space ID identifying a file sharing space and access permission/inhibition information representing the permission or inhibition of access are recorded as a pair. As a simplest example, the access control part 5 can set so as to permit or inhibit access from all IP addresses to a file sharing space, regarding each file sharing space.

In the example shown in FIG. 16, the permission of access from all IP addresses to a file sharing space of a sharing space ID="share0001" is set, and the inhibition of access from all the IP addresses to a file sharing space of a sharing space ID="share0002" is set.

For example, the access control part 5 permits access from all IP addresses to a file sharing space, a data communication terminal cannot access it without obtaining information representing a sharing space ID thereof. Therefore, all data communication terminals do not access the file sharing space. More specifically, only the data communication terminal that has obtained a sharing space ID can access the file sharing space.

The access control data is not limited to the table having a configuration shown in FIG. 16. For example, the access control data may be a file provided for each file sharing space.

Owing to the processing shown in FIGS. 15A and 15B, the access to a file sharing space generated with respect to a telephone conversation is merely inhibited in Operation 1206 even if the telephone conversation is disconnected, so that the file sharing space is not deleted. Therefore, the file sharing space generated with respect to the telephone conversation is stored in the recording part of the file sharing server 8 even when the telephone conversation is disconnected.

Consequently, in the case where a telephone conversation is established again between the same speakers as those in the above telephone conversation, the speakers can access in Operation 705 in FIG. 15A. More specifically, the file sharing space generated in the previous telephone conversation can be used again.

Embodiment 6

Figure 17:
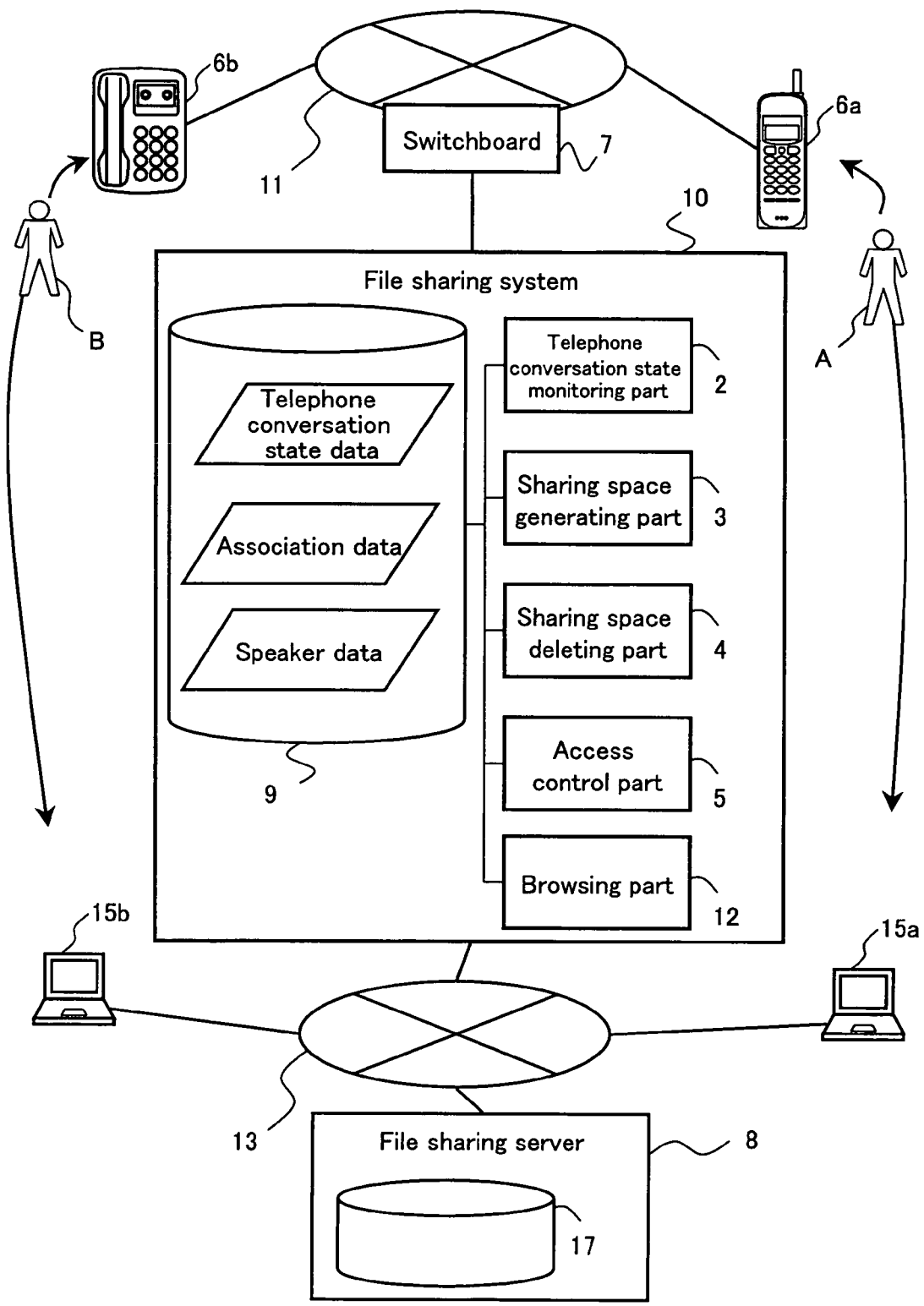
FIG. 17 is a functional block diagram showing an exemplary configuration of a file sharing system.

FIG. 17 is a functional block diagram showing an example of a file sharing system in the present embodiment. In the configuration shown in FIG. 17, the same components as those in the configuration shown in FIG. 1 are denoted with the same reference numerals as those therein, and the description thereof will be omitted.

The file sharing system 10 shown in FIG. 17 further includes a browsing part 12. The browsing part 12 refers to telephone conversation state data or association data recorded in the recording part 9, thereby obtaining data regarding a speaker on the other side in a past telephone conversation of a certain speaker or data in a file sharing space, and transmits them to the data communication terminals 15a, 15b. The browsing part 12 performs the above processing in the case where there is access from the data communication terminals 15a, 15b to the file sharing server 8.

The processing in which the telephone conversation state monitoring part 2 monitors a telephone conversation state in the present embodiment is the same as that shown in FIG. 10.

In the present embodiment, as an example, the case where a speaker A logs in the file sharing server 8 using the terminal communication terminal 15a after finishing a telephone conversation by the telephone conversation terminal 6a.

Figure 18:
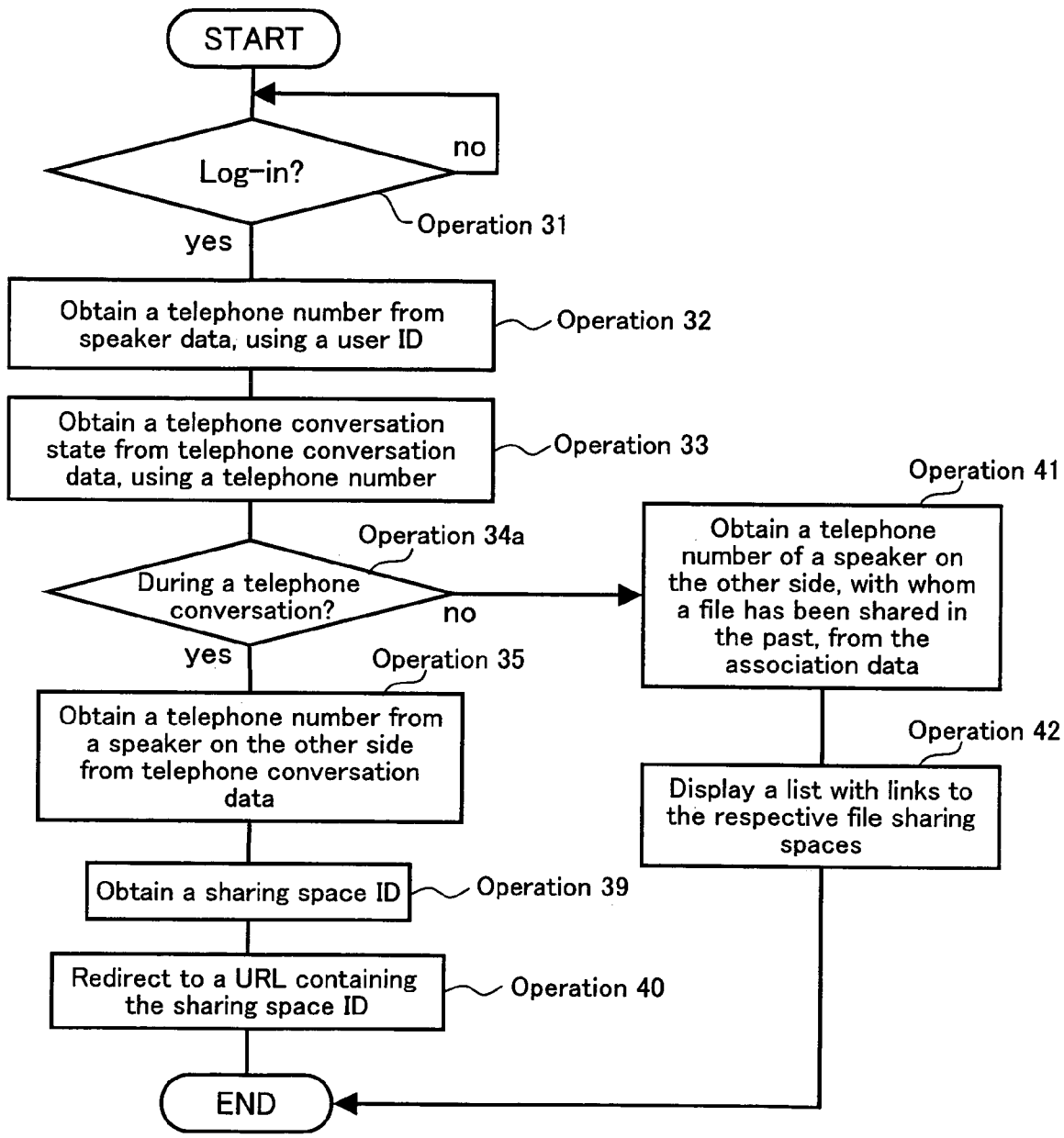
FIG. 18 is a flowchart showing exemplary processing of a file sharing system in the case where there is a log-in from a speaker.

FIG. 18 is a flowchart showing exemplary processing of the access control part 5 and the browsing part 12 of the file sharing system 10 in the case where the speaker A log in the file sharing server 8 from the telephone conversation terminal 6a. In the processing shown in FIG. 18, the same operations as those in the processing shown in FIG. 11 are denoted with the same reference numerals as those therein, and the description thereof will be omitted.

In FIG. 18, a user who has logged in is not having a telephone conversation (No in Operation 34a), the browsing part 12 searches for association data, for example, with a telephone number of the user. The browsing part 12 extracts an entry including the telephone number of the user who has logged in from the association data, and obtains a sharing space ID and the telephone number of a speaker on the other side in the extracted entry (Operation 41). Because of this, the telephone number of the speaker on the other side is obtained, with whom the user having logged in has shared a file sharing space in the past.

Furthermore, the browsing part 12 obtains information such as a URL for accessing the file sharing space represented by the obtained sharing space ID from the recording part 9. The information such as a URL for accessing the file sharing space is recorded in the recording part 9 so as to be associated with the sharing space ID, for example, when the sharing space generating part 3 generates a file sharing space.

The browsing part 12 transmits the obtained telephone number, and the information such as a URL for accessing a file sharing space to the data communication terminal 15a of the user who has logged in. Because of this, in the data communication terminal 15a, for example, a list of telephone numbers of parties who have shared the file sharing spaces in the past is displayed with links to the respective file sharing spaces.

Furthermore, as speaker data, the name of a speaker corresponding to the telephone number of the speaker may be recorded. The name of the speaker is previously recorded in speaker data in the recording part 9 by the speakers A, B through the data communication terminals 15a, 15b.

Figure 19A:
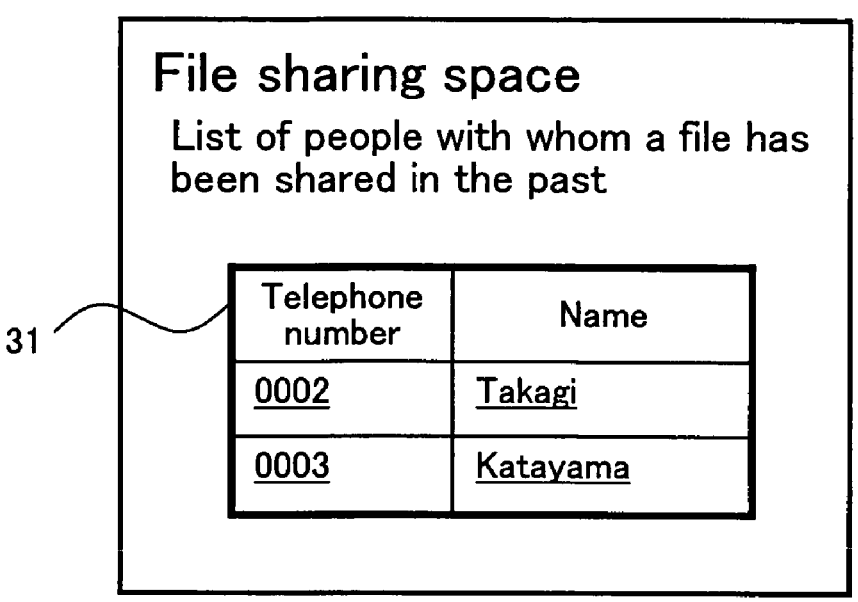
FIG. 19A shows an exemplary screen displaying a list of telephone numbers of a party on the other side with whom a file sharing space has been shared in the past at a data communication terminal.
Figure 19B:
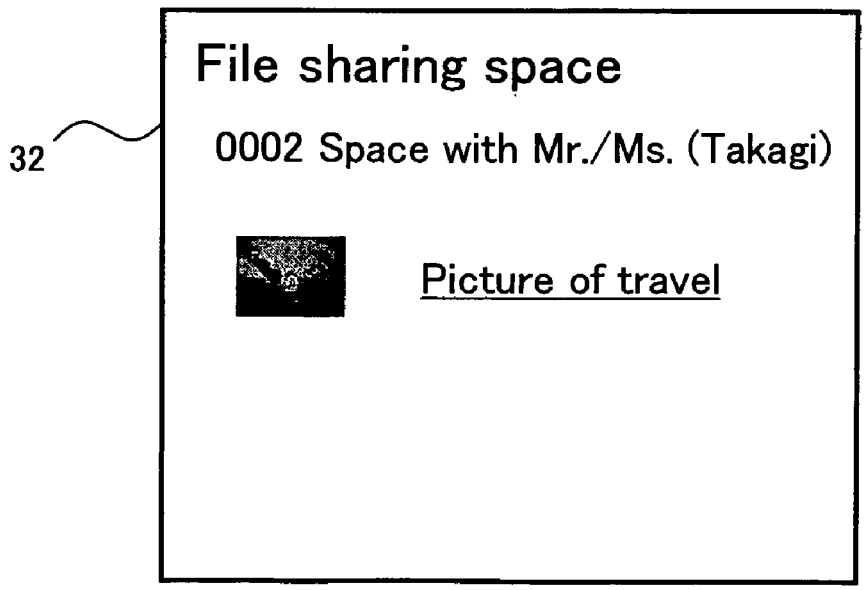
FIG. 19B shows an exemplary screen showing data of the file sharing space.

FIG. 19A shows an exemplary screen displaying a list of telephone numbers of parties who have shared file sharing spaces in the past at the data communication terminal. In FIG. 19A, a list 31 of telephone numbers and names is displayed. The respective telephone numbers or names in the list 31 are provided with links to file sharing spaces. Therefore, for example, when a portion of a telephone number is clicked, a screen 32 showing data of a file sharing space is displayed as in an exemplary screen shown in FIG. 19B.

Although the embodiments of the present invention have been described, the present invention is not limited to the above embodiments. For example, although the file sharing system 1 shown in FIG. 1 is connected to the telephone network 11 including a public exchange telephone network and the Internet 13, the file sharing system may be connected to on-premise telephone network such as a company or school, and an intranet. Furthermore, although only two telephone conversation terminals 6a, 6b shown in FIG. 1 are illustrated for simplicity of the description, a number of telephone conversation terminals are actually connected to the telephone network 11. Similarly, a number of data communication terminals are connected to the Internet 13.

In the present embodiment, a file sharing system connected to both the telephone network 11 and the Internet 13 has been described. However, for example, in the case where a telephone conversation between telephone conversation terminals is performed on the Internet as in an IP telephone, a file sharing system is connected to only the Internet.

In the present embodiment, the case where a telephone conversation is performed by two speakers has bee described. However, the present invention is also applicable even in the case where three or more speakers have a telephone conversation.

The present invention is directed to a system connected to a telephone network and a data communication network, and can be used as a file sharing system enabling a speaker having a telephone conversation via a telephone network to share a file with a party on the other side via a data communication network.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A file sharing system connected to a telephone conversation control apparatus that controls a telephone conversation between a plurality of telephone conversation terminals, comprising:

a telephone conversation state monitoring part for detecting a telephone conversation between the telephone conversation terminals and obtaining information for specifying speakers on both sides having a telephone conversation for each telephone conversation, from the telephone conversation control apparatus, and recording the information in a recording part as telephone conversation state data;

a sharing space generating part for generating a file sharing space to be shared by the speakers on both sides specified by the telephone conversation state data on a recording medium accessible from a plurality of data communication terminals, associating information for identifying the generated file sharing space with the information for specifying the speakers on both sides, and recording them in the recording part as association data; and an access control part for enabling access of the speakers on both sides corresponding to the file sharing space represented by the association data from the data communication terminals, among accesses from the data communication terminals with respect to the file sharing space.

2. The file sharing system according to claim 1, wherein the telephone conversation state monitoring part detects commencement of the telephone conversation between the telephone conversation terminals, obtains the information for identifying the speakers having a telephone conversation for each telephone conversation, and records the information in the recording part as telephone conversation state data, and the sharing space generating part generates the file sharing space at a time when the commencement of the telephone conversation is detected.

3. The file sharing system according to claim 1, wherein the telephone conversation state monitoring part further detects a signal that is transmitted from the telephone conversation terminals during a telephone conversation and designates generation of the file sharing space, and the sharing space generating part generates the file sharing space after the telephone conversation state monitoring part detects the signal.

4. The file sharing system according to claim 1, wherein the recording medium on which the file sharing space is generated is a recording part of a previously determined file sharing server, and in a case where there is access from a data communication terminal to the file sharing server, the sharing space generating part obtains user information for specifying a user from the data communication terminal, compares the user information with the information for specifying the speakers having a telephone conversation recorded in the telephone conversation state data, and generates the file sharing space in a case of determining that the user is identical with one of the speakers having a telephone conversation.

5. The file sharing system according to claim 1, wherein the telephone conversation state monitoring part further detects completion of the telephone conversation, the file sharing system further comprising a sharing space deleting part for obtaining information for identifying the file sharing space corresponding to the speakers in the telephone conversation whose completion is detected by the telephone conversation state monitoring part, and deleting the file sharing space represented by the information immediately after the detection or after an elapse of a predetermined time from the detection.

6. The file sharing system according to claim 1, wherein the telephone conversation state monitoring part further detects completion of the telephone conversation, and the access control part obtains the information for identifying the file sharing space of the speakers in the telephone conversation whose completion is detected by the telephone conversation state monitoring part from the association data, and inhibits access from data communication terminals to the file sharing space represented by the information immediately after the completion of the telephone conversation or after an elapse of a predetermined time from the completion of the telephone conversation.

7. The file sharing system according to claim 6, wherein regarding the file sharing space whose access from the data communication terminals is inhibited, in a case where the telephone conversation by the speakers on both sides associated with the file sharing space by the association data is detected by the telephone conversation state monitoring part, the access control part permits access from the data communication terminals to the file sharing space by the speakers on both sides.

8. The file sharing system according to claim 1, wherein the recording medium on which the file sharing space is generated is a recording part of a previously determined file sharing server, the file sharing system further comprising a browsing part for, in a case where there is access from a data communication terminal to the file sharing server, obtaining user information for specifying a user from the data communication terminal, obtaining data for specifying a speaker on the other side in a past telephone conversation of the user or data in a file sharing space generated in a past telephone conversation from the association data, and transmitting the data regarding the speaker on the other side or the data in the file sharing space to the data communication terminal.

9. The file sharing system according to claim 1, wherein the telephone conversation state monitoring part detects the telephone conversation between the telephone conversation terminals and obtains the information for specifying the speakers on both sides having a telephone conversation for each telephone conversation, from the telephone conversation control apparatus provided in a telephone network to which a plurality of telephone conversation terminals are connected, and recording the information in the recording part as telephone conversation state data, and the sharing space generating part generates the file sharing space on the recording medium on a computer connected to a data communication network to which a plurality of data communication terminals are connected.

10. The file sharing system according to claim 1, wherein the access control part transmits information for accessing the file sharing space to the data communication terminals of the speakers on both sides represented by the information for specifying the speakers on both sides corresponding to the file sharing space in the association data, thereby enabling access from the data communication terminals of the speakers on both sides.

11. The file sharing system according to claim 1, wherein in a case where there is access from the data communication terminal to the file sharing space, the access control part obtains user information for specifying a user from the data communication terminal, compares the user information with the information specifying the speakers on both sides corresponding to the file sharing space in the association data, and in a case of determining that either one of the speakers is matched with the user, enables access from the data communication terminal.

12. A recording medium storing a file sharing program for causing a computer connected to a telephone conversation control apparatus controlling a telephone conversation between a plurality of telephone conversation terminals to execute processing, comprising:

telephone conversation state monitoring processing of detecting a telephone conversation between the telephone conversation terminals and obtaining information for specifying speakers on both sides having a telephone conversation for each telephone conversation, from the telephone conversation control apparatus, and recording the information in a recording part provided in the computer as telephone conversation state data;

sharing space generating processing of generating a file sharing space to be shared by the speakers on both sides specified by the telephone conversation state data on a recording medium accessible from a plurality of data communication terminals, associating information for identifying the generated file sharing space with the information for specifying the speakers on both sides, and recording them in the recording part as association data; and access control processing of permitting access from the data communication terminals by the speakers on both sides represented by the information for specifying the speakers corresponding to the file sharing space in the association data, among accesses from the data communication terminals with respect to the file sharing space.

13. A file sharing method for enabling speakers to share a file by using a computer connected to a telephone conversation control apparatus controlling a telephone conversation between a plurality of telephone conversation terminals, the method comprising:

a telephone conversation state monitoring operation in which a telephone conversation state monitoring part provided in the computer detects a telephone conversation between the telephone conversation terminals and obtains information for specifying speakers on both sides having a telephone conversation for each telephone conversation, from the telephone conversation control apparatus, and records the information in a recording part provided in the computer as telephone conversation state data;

a sharing space generating operation in which a sharing space generating part provided in the computer generates a file sharing space to be shared by the speakers on both sides specified by the telephone conversation state data on a recording medium accessible from a plurality of data communication terminals, associates information for identifying the generated file sharing space with the information for specifying the speakers on both sides, and records them in the recording part as association data; and an access control operation in which the access control part provided in the computer permits access from the data communication terminals by the speakers on both sides represented by the information for specifying the speakers corresponding to the file sharing space in the association data, among accesses from the data communication terminals with respect to the file sharing space.

* * * * *